US011409140B2

(12) United States Patent
Shi et al.

(10) Patent No.: US 11,409,140 B2
(45) Date of Patent: Aug. 9, 2022

(54) OPTICAL PHASE MODULATOR AND OPTICAL MODULATOR

(71) Applicant: UNIVERSITÉ LAVAL, Québec (CA)

(72) Inventors: Wei Shi, Quebec (CA); Larochelle Sophie, Québec (CA); Omid Jafari, Québec (CA)

(73) Assignee: UNIVERSITÉ LAVAL, Quebec (CA)

(*) Notice: Subject to any disclaimer, the term of this patent is extended or adjusted under 35 U.S.C. 154(b) by 0 days.

(21) Appl. No.: 16/978,785

(22) PCT Filed: Mar. 8, 2019

(86) PCT No.: PCT/CA2019/050291
§ 371 (c)(1),
(2) Date: Sep. 8, 2020

(87) PCT Pub. No.: WO2019/169507
PCT Pub. Date: Sep. 12, 2019

(65) Prior Publication Data
US 2020/0409187 A1    Dec. 31, 2020

Related U.S. Application Data

(60) Provisional application No. 62/640,658, filed on Mar. 9, 2018.

(51) Int. Cl.
*G02F 1/025* (2006.01)
*G02F 1/01* (2006.01)
(Continued)

(52) U.S. Cl.
CPC ............ *G02F 1/025* (2013.01); *G02F 1/0121* (2013.01); *H04B 10/548* (2013.01);
(Continued)

(58) Field of Classification Search
CPC ....... G02F 1/025; G02F 1/0121; G02F 1/0151
See application file for complete search history.

(56) References Cited

U.S. PATENT DOCUMENTS 9,172,472 B2 * 10/2015 Daunt ................ H04B 10/5561
2005/0175305 A1    8/2005 Liu et al.
(Continued)

FOREIGN PATENT DOCUMENTS

GB          2523434 A      8/2015

OTHER PUBLICATIONS

Bedard et al., Dual phase-shift Bragg grating silicon photonic modulator operating up to 60 Gb/s, Optics Express, V. 24, N. 3, 2016 (Year: 2016).*

(Continued)

*Primary Examiner* — Peter Radkowski
(74) *Attorney, Agent, or Firm* — Reno Lessard; Norton Rose Fulbright Canada LLP

(57) ABSTRACT

There is described an optical phase modulator generally having a substrate; a waveguide mounted to the substrate and extending along a path of the substrate, the waveguide having a first series of phase shift units distributed along the waveguide, each phase shift unit having two Bragg gratings being spaced apart from one another along the path and a cavity between the two spaced-apart Bragg gratings; and a modulation circuit configured for driving a length of the series of phase shift units of the waveguide in accordance with a modulation signal thereby modulating a refractive index of the waveguide to induce a phase shift to an optical signal propagating along the waveguide.

20 Claims, 32 Drawing Sheets

(51) Int. Cl.
*H04B 10/548* (2013.01)
*G02F 1/015* (2006.01)

(52) U.S. Cl.
CPC ...... *G02F 1/0151* (2021.01); *G02F 2201/307* (2013.01); *G02F 2203/50* (2013.01)

(56) References Cited

U.S. PATENT DOCUMENTS

| | | |
|---|---|---|
| 2008/0253711 A1 | 10/2008 | Zheng et al. |
| 2015/0063827 A1* | 3/2015 | Daunt ............... H04B 10/5561 398/188 |
| 2015/0277158 A1 | 10/2015 | Akiyama |

OTHER PUBLICATIONS

Romero-García, Sebastian, et al. "High-speed resonantly enhanced silicon photonics modulator with a large operating temperature range." Optics letters 42.1 (2017): 81-84.
Jafari, Omid, et al. "Silicon Photonic Modulator based on Coupled Bragg Grating Resonators used as Phase Shifters." Optical Fiber Communication Conference. Optical Society of America, 2018.
Caverley, Michael, et al. "Silicon-on-insulator modulators using a quarter-wave phase-shifted Bragg grating." IEEE Photonics Technology Letters 27.22 (2015): 2331-2334.
Bédard, Kevin, et al. "Dual phase-shift Bragg grating silicon photonic modulator operating up to 60 Gb/s." Optics express 24.3 (2016): 2413-2419.
Li Rui et al: "An 80 Gb/s Silicon Photonic Modular Based on the Principle of Overlapped Resonances", IEEE Photonics Journal, IEEE, USA, vol. 9, No. 3, Jun. 1, 2017 (Jun. 1, 2017), pp. 1-11, XP011649790, DOI: 10.1109/JPHOT.207.2702101.

\* cited by examiner

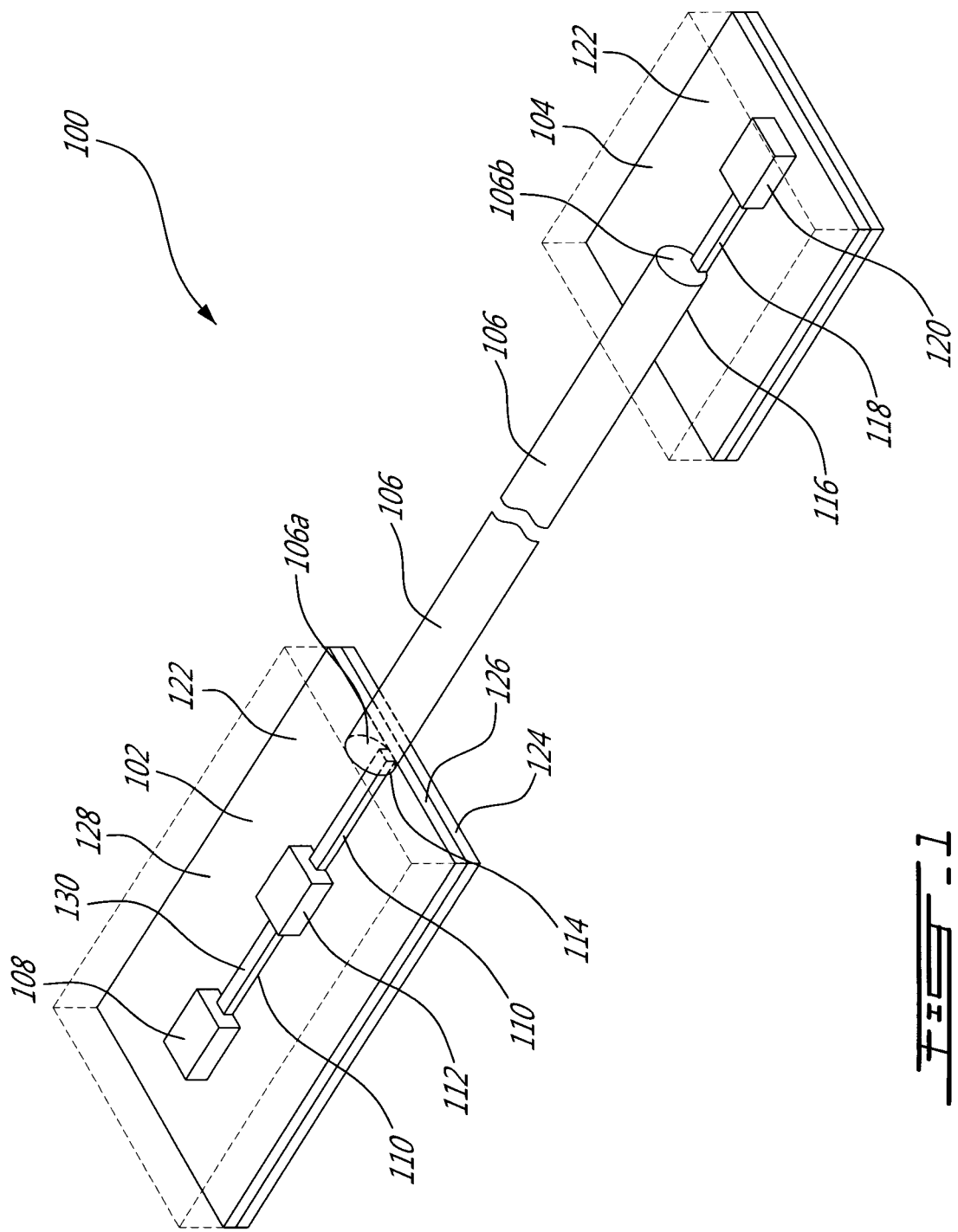

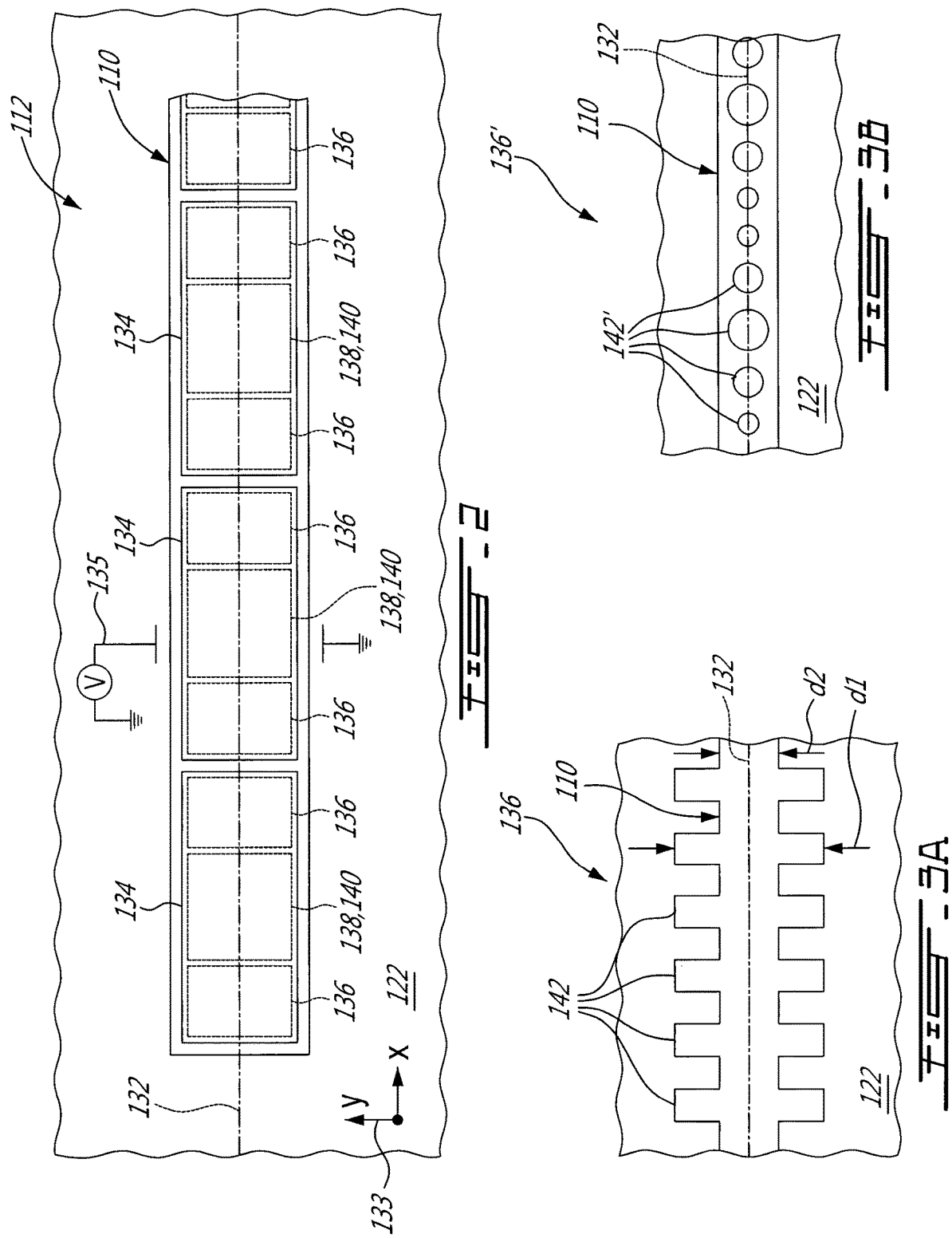

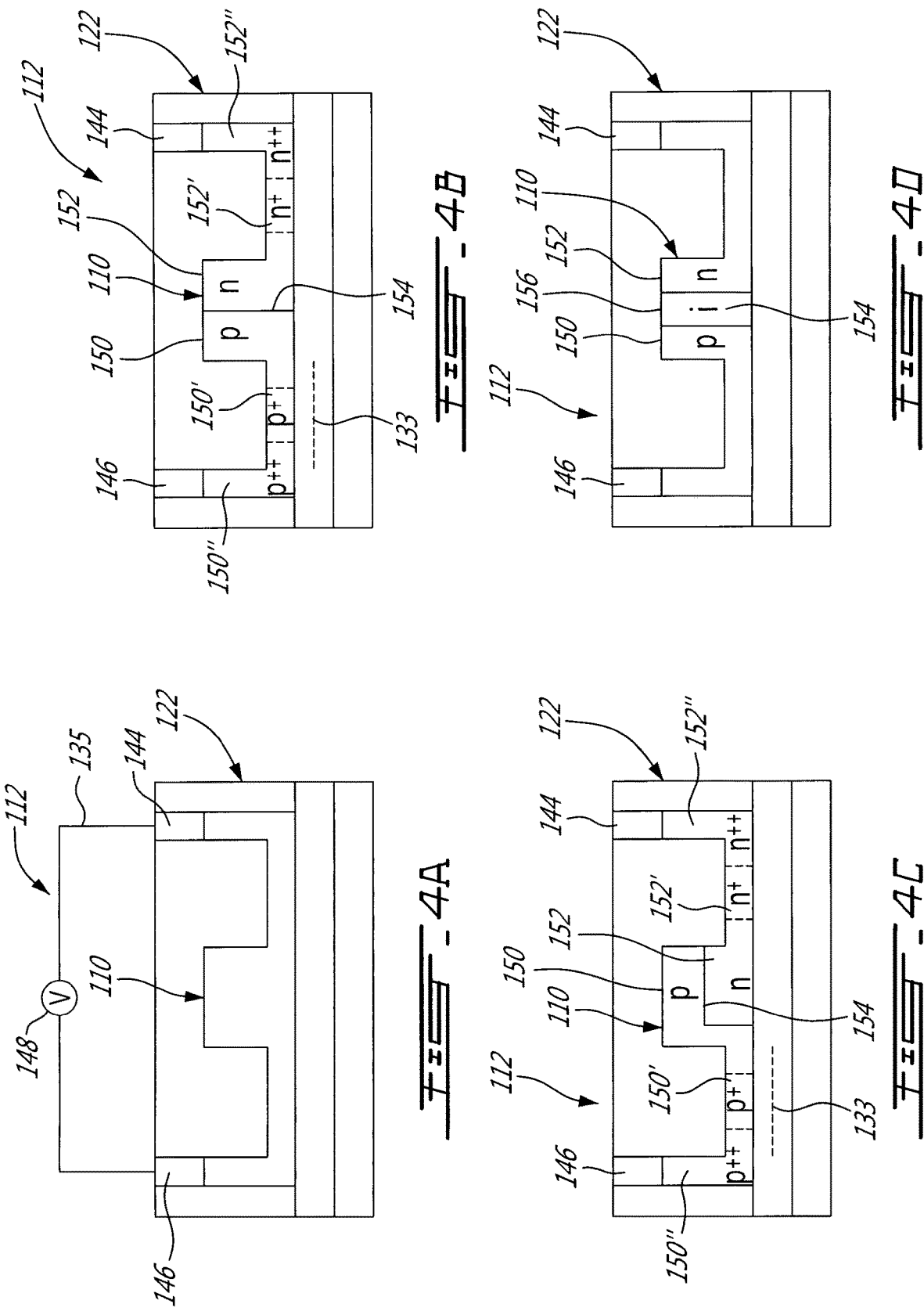

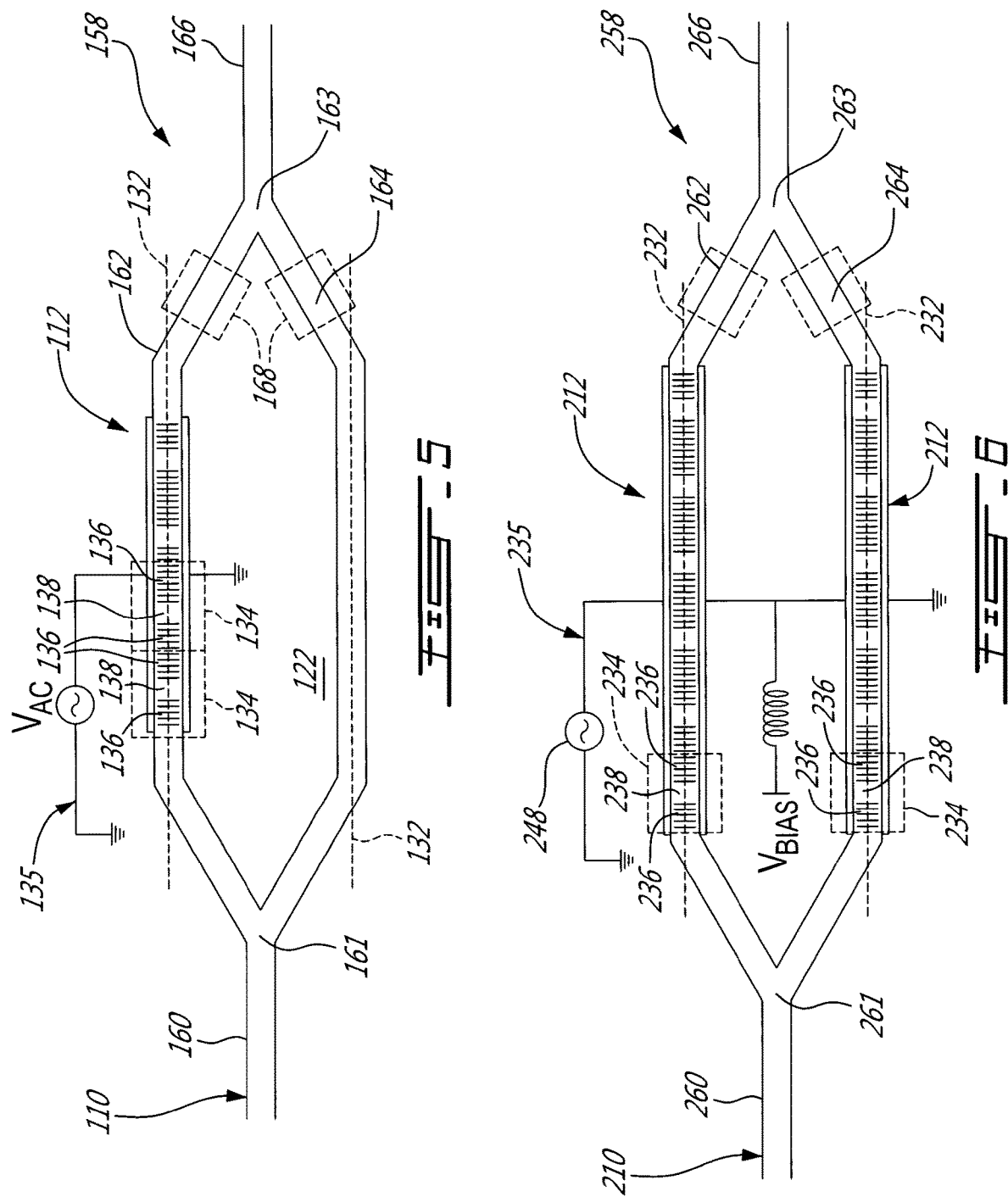

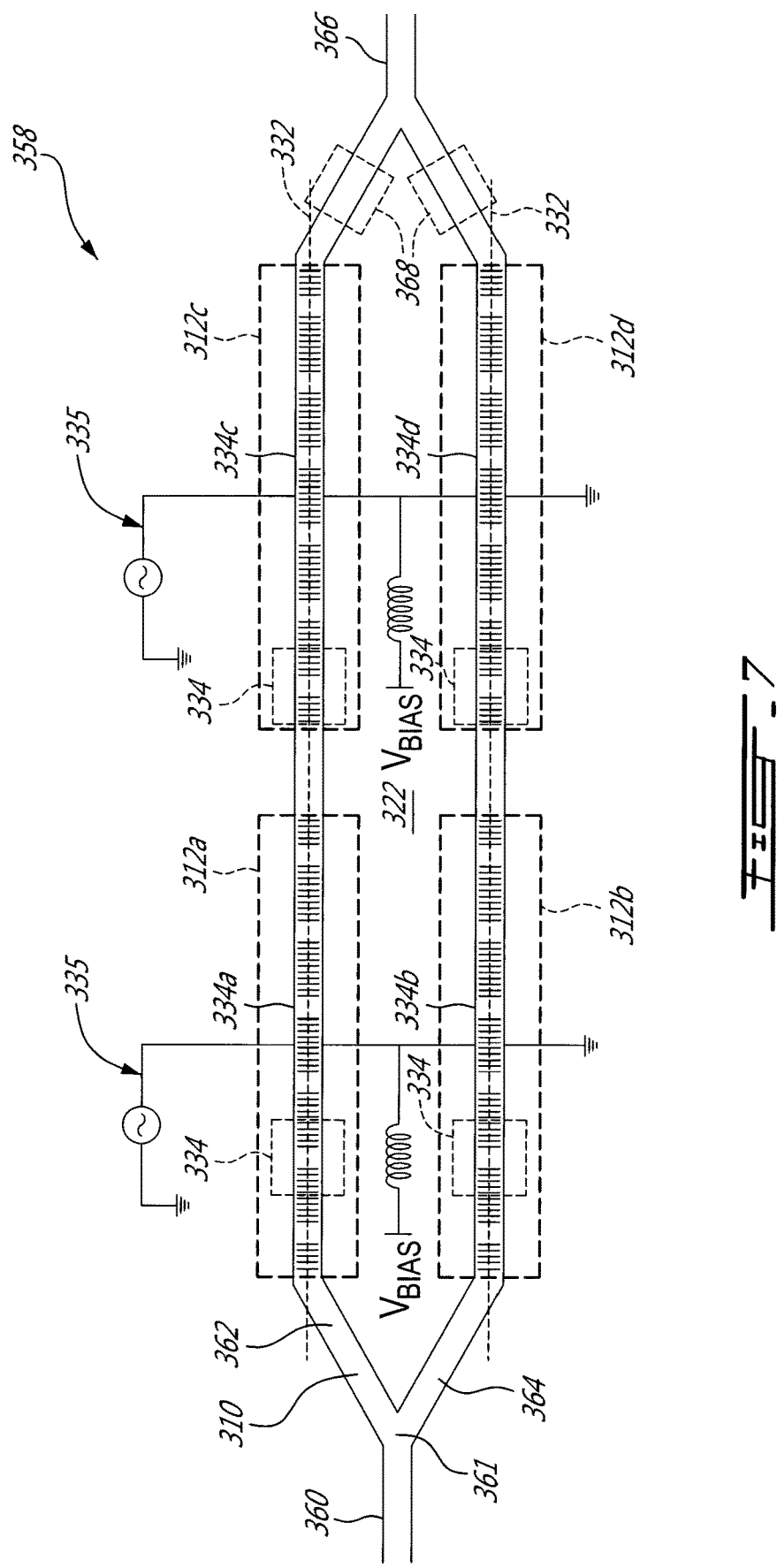

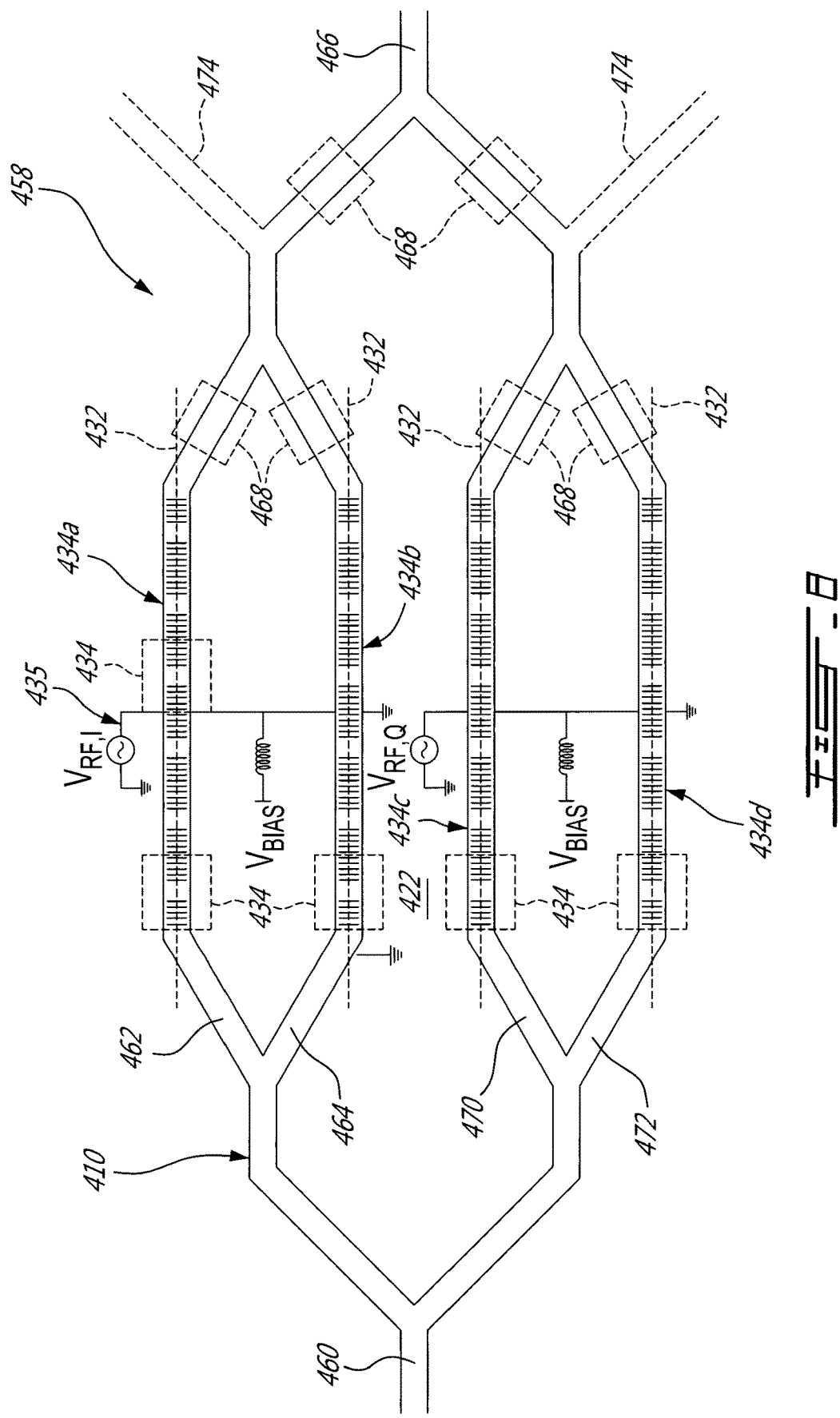

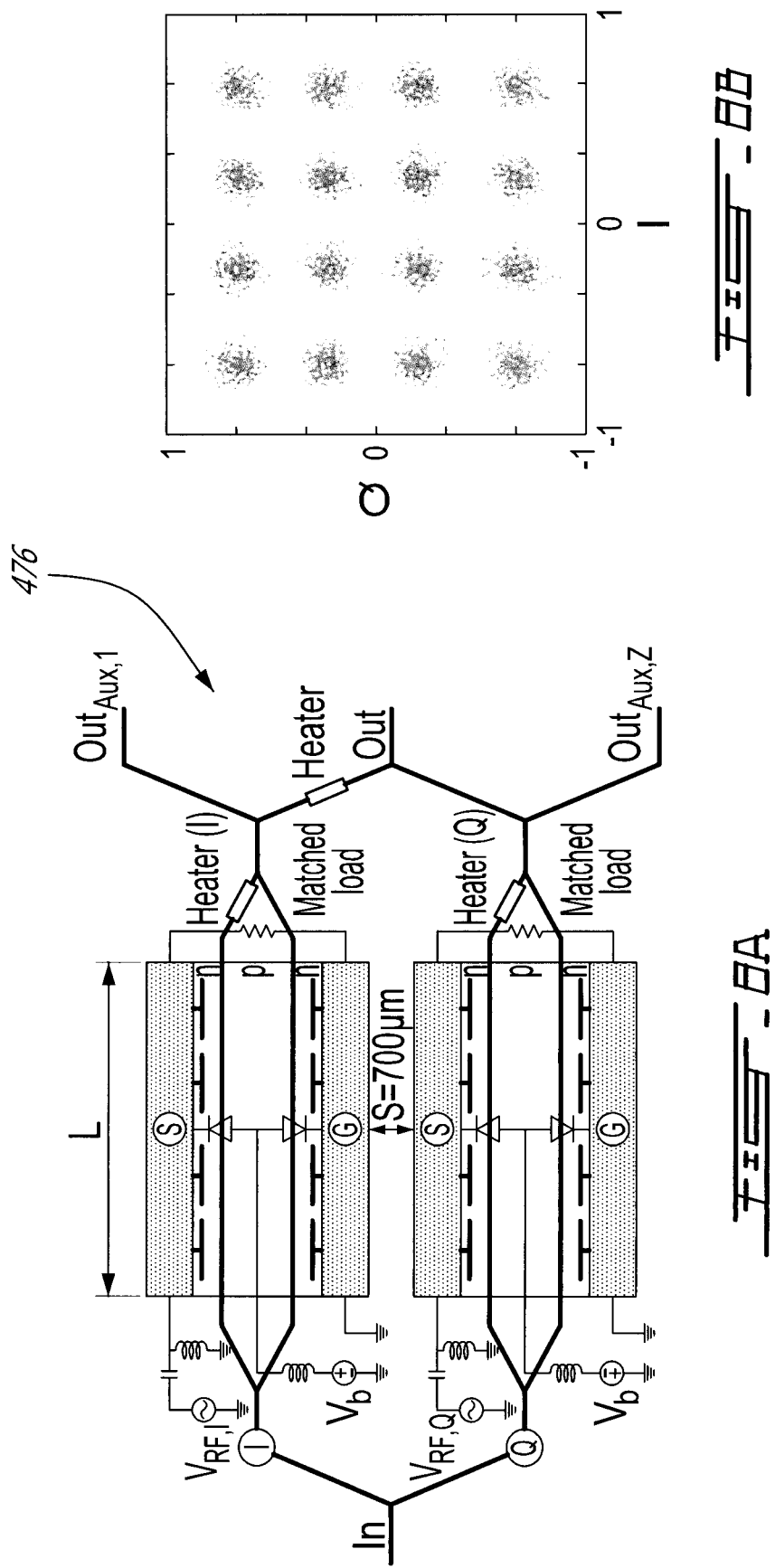

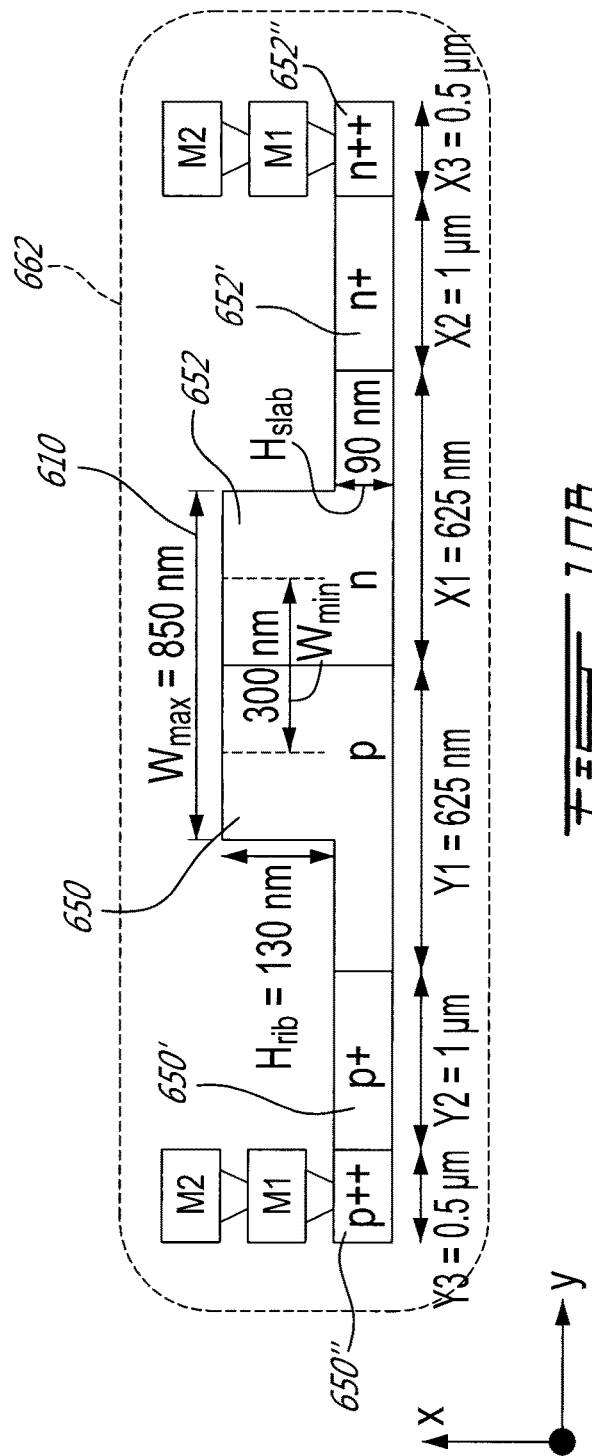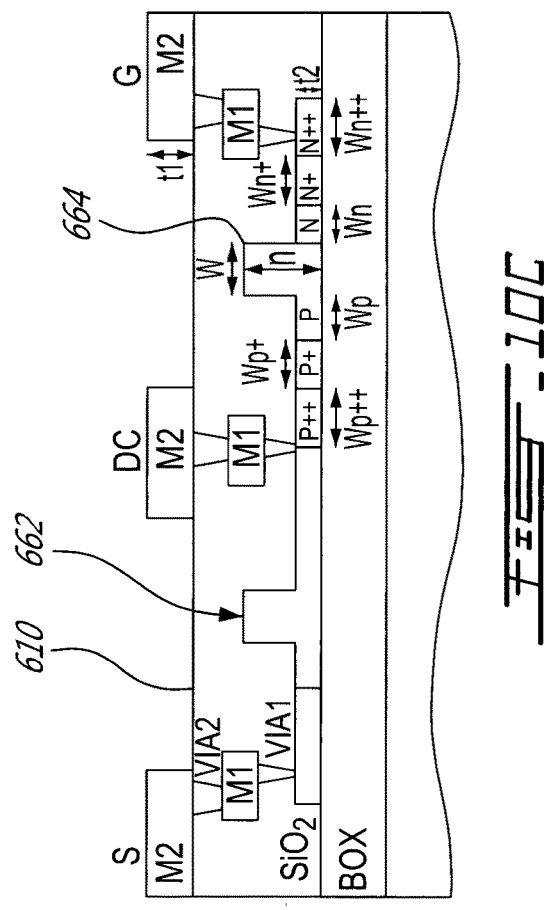
FIG. 10B
FIG. 10C

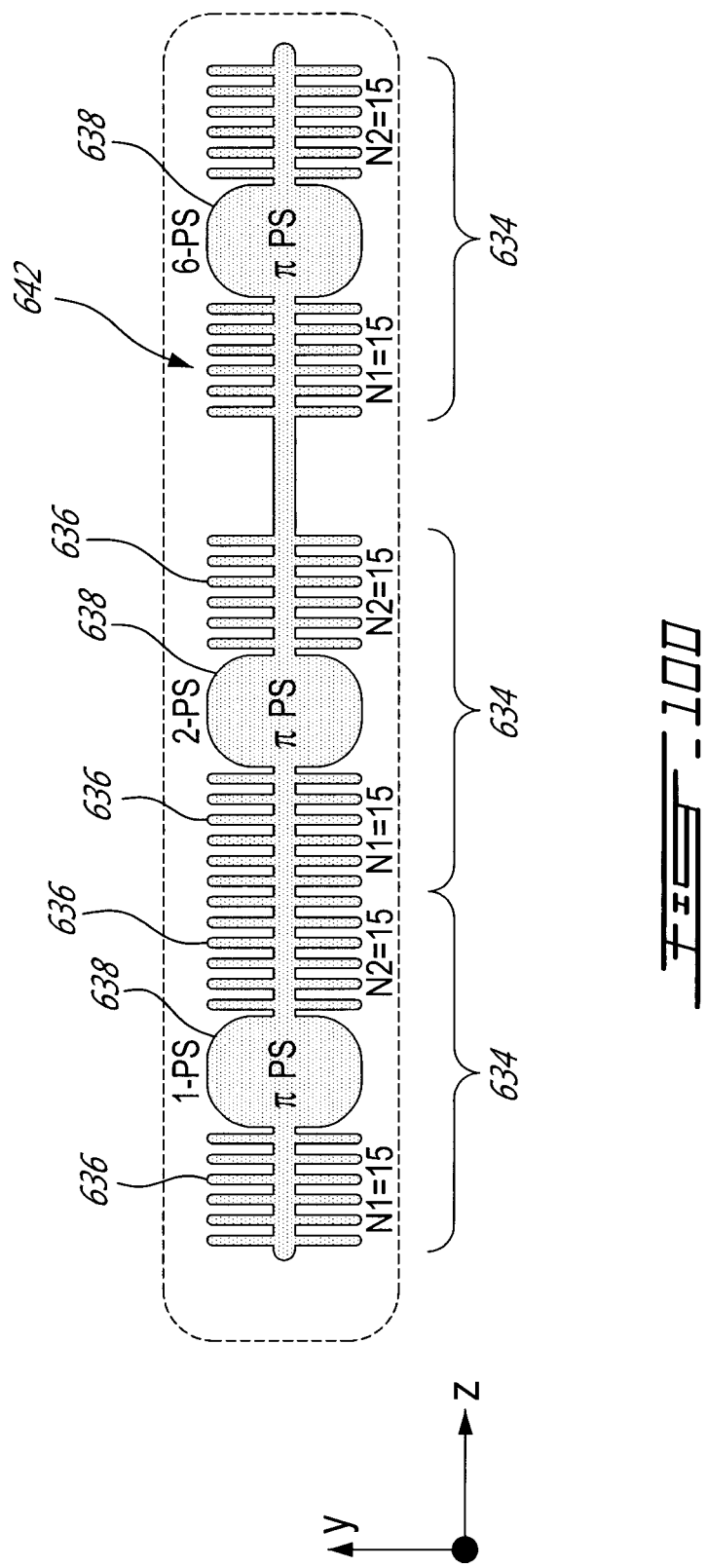

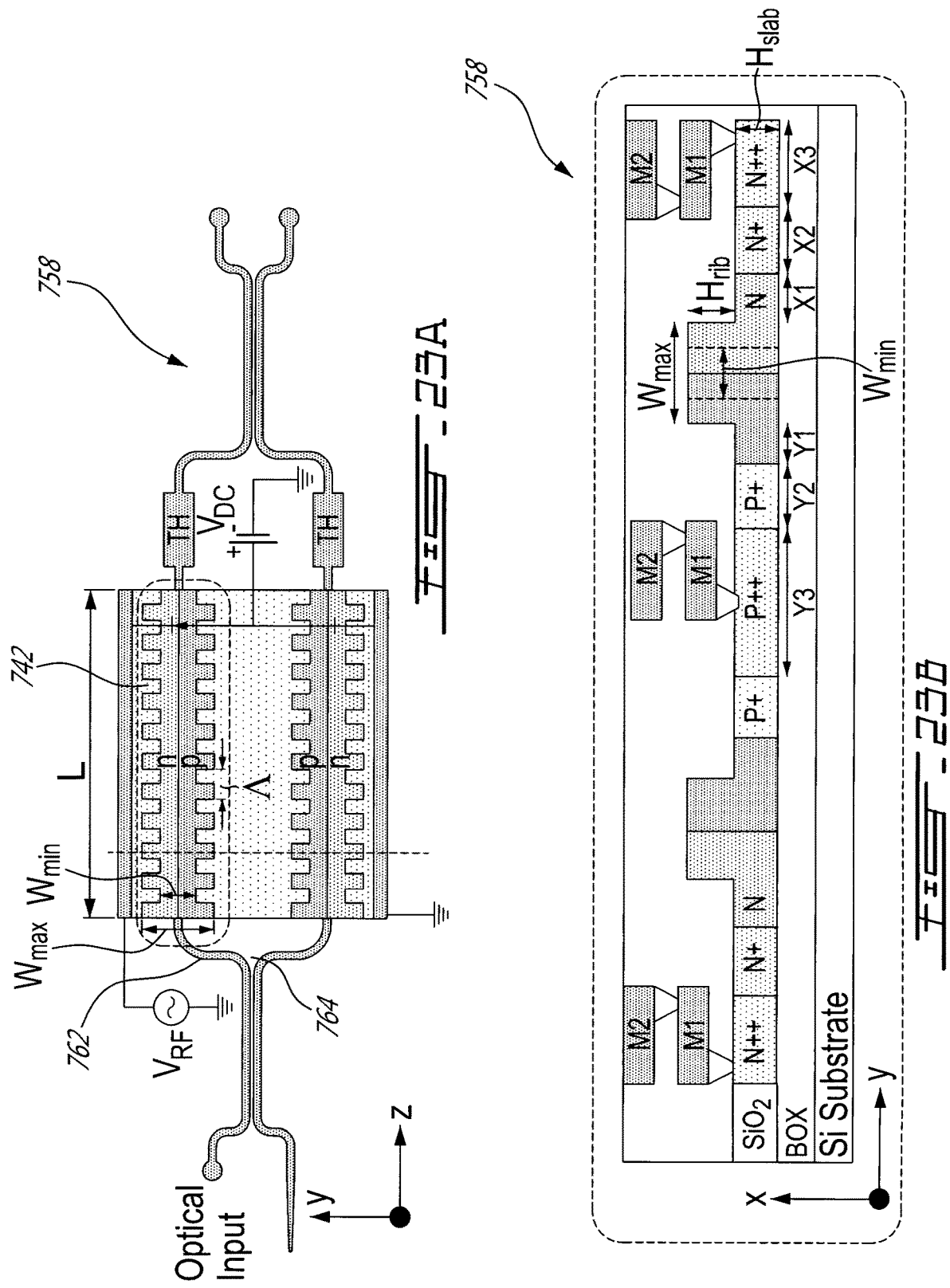

OPTICAL PHASE MODULATOR AND OPTICAL MODULATOR

FIELD

The improvements generally relate to the field of optical interconnect systems and more specifically to optical phase modulators used in such optical interconnect systems.

BACKGROUND

Optical interconnect systems are a means of communication by optical fiber cables which are progressively replacing traditional copper wires at shorter distances in information processing systems as they allow for faster communication.

As such, an optical interconnect system generally includes a first photonic chip which is communicatively coupled to a second photonic chip via an optical fiber cable, both photonic chips including photonic components being manufactured using conventional semiconductor fabrication processes to allow mass production at low costs.

Typically, the first photonic chip has at least an optical source generating an optical signal along a semiconductor waveguide, an optical phase modulator encoding data into the optical signal propagating along the semiconductor waveguide, and coupling means to couple the encoded optical signal into an end of an optical fiber cable. The second photonic chip generally has at least coupling means to couple the encoded optical signal received from the other end of the optical fiber cable along a semiconductor waveguide leading to an optical detector, which reproduces the data from the received optical signal.

The optical phase modulator is generally configured to modulate a refractive index along a length of the semiconductor waveguide in which the optical signal is propagating, thus modifying the phase of the optical signal accordingly. One technique to achieve such phase modulation is to vary the density of free charge carriers along the semiconductor waveguide as variations of electron and hole densities change the real and imaginary parts of the refractive index of the semiconductor waveguide. These variations are generally obtained by driving the semiconductor waveguide along a length thereof using a voltage source.

Although existing optical phase modulators are satisfactory to a certain degree, there remains room for improvement.

SUMMARY

It is known that some semiconductor materials such as silicon typically have none or insignificant linear electro-optic effect whereas the quadratic electro-optic, electro-absorption and plasma dispersion effects are all relatively weak. Accordingly, to achieve satisfactory phase modulation, the length of semiconductor waveguide which is driven with a bias voltage and/or with a modulation signal has to be relatively long. Additionally or alternately, the bias voltage and/or the modulation signal has to be significantly high to achieve satisfactory phase modulation.

However, having relatively long optical modulators is typically not as convenient as relatively short optical modulators, which would allow other photonic components to be integrated to the chip and/or the chip to have a smaller footprint. Moreover, having to provide a high bias voltage or a high amplitude modulation signal to the semiconductor waveguide to achieve satisfactory phase modulation is an issue, as it would consume more energy.

It is worth mentioning that energy efficiency is key in the development of next generation optical interconnect systems. For instance, one of the most sought after applications for such optical interconnect systems is in communicatively coupling thousands of servers to one another in data centers, which currently supply the increasing demand for information technology operations. As of 2018, the United States' Office of Energy Efficiency and Renewable Energy submits that data centers are one of the most energy-intensive buildings, consuming 10 to 50 times the energy per floor space of a typical commercial office building and collectively accounting for approximately 2% of the total U.S. electricity. Accordingly, any energy consumption reduction in optical interconnect systems can have non-negligible environmental and economic impacts.

In an aspect, there is described an optical phase modulator having a semiconductor substrate, a semiconductor waveguide mounted to the semiconductor substrate and extending along a path of the semiconductor substrate. The semiconductor waveguide has a series of phase shift units distributed along the semiconductor waveguide. Each phase shift unit has two Bragg gratings which are spaced apart from one another along the path and a cavity between the two spaced-apart Bragg gratings. A modulation circuit is also provided for driving a length of the semiconductor waveguide in accordance with a modulation signal thereby modulating a refractive index of the length of the semiconductor waveguide to induce a phase shift to the optical signal propagating therealong.

It was found that such series of phase shift units can cause the optical signal to experience a resonance effect which can sharply enhance a first-order dispersion of the semiconductor material of the semiconductor waveguide and which in turn can enhance its group index, which depends on the first-order dispersion. As the effective propagation speed of the optical signal in a material is given by the speed of light in vacuum divided by the group index of that material, the effective propagation speed can thus be greatly reduced, thereby allowing phase modulation to be more efficient and sensitive to the modulation signal.

In another aspect, there is described a Mach-Zehnder modulator having a semiconductor substrate, a semiconductor waveguide extending along the semiconductor substrate, a first coupler coupling the semiconductor waveguide into first and second arm portions connected in parallel to one another and each extending along a respective path, a second coupler combining the first and second arm portions to one another and leading to at least one output portion. In this embodiment, the first arm portion has a first series of phase shift units distributed therealong. Each phase shift unit has two Bragg gratings which are spaced apart from one another along the path and a cavity between the two spaced-apart Bragg gratings. A modulation circuit is also provided for driving a length of the first arm portion in accordance with a first modulation signal thereby modulating a refractive index of the length of the first arm portion of the semiconductor waveguide to induce a phase shift to the optical signal propagating therealong.

With such a Mach-Zehnder modulator, modulating the phase of the optical signal propagating in the first arm portion can result in amplitude modulation once the optical signal propagating in the first arm portion recombines with the optical signal propagating in the second arm portion via constructive/destructive interference.

Moreover, as the amplitude modulation depends on the length and refractive index of both the first and second arm portions, which can typically vary together as temperature fluctuates, the resulting Mach-Zehnder modulator can be temperature-independent on a given temperature range. Therefore, as long as the Mach-Zehnder modulator is operated in the given temperature range, the energy consumption to control the temperature of the Mach-Zehnder modulator is likely to be minimal, thus reducing energy consumption.

In some embodiments, the second arm portion of the semiconductor waveguide has a second series of phase shift units. Each phase shift unit has two Bragg gratings which are spaced apart from one another along the path and a cavity between the two spaced-apart Bragg gratings. In these embodiments, the modulation circuit is also configured for driving a length of the second arm portion in accordance with the first modulation signal or in accordance with a second modulation signal thereby modulating a refractive index of the length of the second arm portion of the semiconductor waveguide to induce a phase shift to the optical signal propagating therealong. In these embodiments, the modulation circuit is such that both the first and second arm portions are driven simultaneously in opposite directions so that the total phase shift can be doubled.

Although the examples described herein involve the use of semiconductor materials, the inventors submit that the optical phase modulators and optical modulators described herein can involve semiconductors materials, as well as any other non-semiconductor materials which can exhibit at least some electro-optic effect(s) modifying a refractive index of the selected non-semiconductor material upon applying an electrical excitation thereto. An example of such an electro-optic effect includes, but is not limited to, the Pockels effect. Examples of such non-semiconductor materials can include, but are not limited to, lithium niobate (LiNbO3), polymers and the like.

In accordance with one aspect, there is provided an optical phase modulator comprising: a substrate; a waveguide mounted to the substrate and extending along a path of the substrate, the waveguide having a first series of phase shift units distributed along the waveguide, each phase shift unit having two Bragg gratings being spaced apart from one another along the path and a cavity between the two spaced-apart Bragg gratings; and a modulation circuit configured for driving a length of the series of phase shift units of the waveguide in accordance with a modulation signal thereby modulating a refractive index of the waveguide to induce a phase shift to an optical signal propagating along the waveguide.

In accordance with another aspect, there is provided an optical modulator comprising: a substrate; a waveguide extending along the substrate, the waveguide having an input portion leading to first and second arm portions connected in parallel to one another and each extending along a respective path, the first and second arm portions combining to one another into at least one output portion, the first arm portion having a first series of phase shift units distributed therealong, each phase shift unit having two Bragg gratings which are spaced apart from one another along the path and a cavity between the two spaced-apart Bragg gratings; and a modulation circuit configured for driving a length of the first series of phase shift units of the first arm portion of the waveguide in accordance with a first modulation signal thereby modulating a refractive index of the length of the first arm portion of the waveguide to induce a phase shift to the optical signal propagating therealong.

It will be understood that the expression "computer" as used herein is not to be interpreted in a limiting manner. It is rather used in a broad sense to generally refer to the combination of some form of one or more processing units and some form of memory system accessible by the processing unit(s). Similarly, the expression "controller" as used herein is not to be interpreted in a limiting manner but rather in a general sense of a device, or of a system having more than one device, performing the function(s) of controlling one or more device.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIG. 1 is an oblique view of an example of an optical interconnect system including a first photonic chip having an optical phase modulator, in accordance with an embodiment;

FIG. 2 is a top plan and partial view of the optical phase modulator of FIG. 1, with a semiconductor waveguide having a series of phase shift units each having two Bragg gratings and a cavity therebetween;

FIG. 3A is a top plan and partial view of an example of the semiconductor waveguide of FIG. 2, with Bragg gratings provided in the form of a series of corrugations;

FIG. 3B is a top plan and partial view of an example of the semiconductor waveguide of FIG. 2, with Bragg gratings provided in the form of a series of apertures;

FIG. 4A is a sectional view of an example of the semiconductor waveguide of FIG. 2, with anode and cathode terminals connected to the semiconductor waveguide;

FIG. 4B is a sectional view of another example of the semiconductor waveguide of FIG. 2, with a PN junction extending across a plane of a semiconductor substrate;

FIG. 4C is a sectional view of another example of the semiconductor waveguide of FIG. 2, with a PN junction extending along a plane of a semiconductor substrate;

FIG. 4D is a sectional view of another example of the semiconductor waveguide of FIG. 2, with a PIN junction extending across a plane of a semiconductor substrate;

FIG. 5 is a top plan view of an example of a Mach-Zehnder optical modulator having an arm portion with the optical phase modulator of FIG. 2;

FIG. 6 is a top plan view of another example of a Mach-Zehnder optical modulator having two arm portions each having the optical phase modulator of FIG. 2;

FIG. 7 is a top plan view of an example of a pulse amplitude modulator having first and second semiconductor waveguides each having two longitudinally spaced apart optical phase modulators;

FIG. 8 is a top plan view of an example of a coherent modulator having two Mach-Zehnder optical modulators connected in parallel to one another;

FIG. 8A is a schematic view of the coherent modulator of FIG. 8;

FIG. 8B is a graph showing IQ amplitudes as obtained by the coherent modulator of FIG. 8;

FIG. 10B is a cross-sectional view of one of the two arm portions of the semiconductor waveguide of the optical modulator of FIG. 10A;

FIG. 10C is a cross-sectional view of the two arm portions of the semiconductor waveguide of the optical modulator of FIG. 10A;

FIG. 10D is a top plan view of one of the two arm portions of the semiconductor waveguide of the optical modulator of FIG. 10A, showing that each phase shift unit has two Bragg gratings and a cavity between the two Bragg gratings;

FIG. 23A is a schematic view of another example of an optical modulator having a Mach-Zehnder configuration with a semiconductor waveguide having two arm portions each having a series of phase shift units;

FIG. 23B is a cross-sectional view of one of the two arm portions of the semiconductor waveguide of the optical modulator of FIG. 23A;

DETAILED DESCRIPTION

Figure 9:
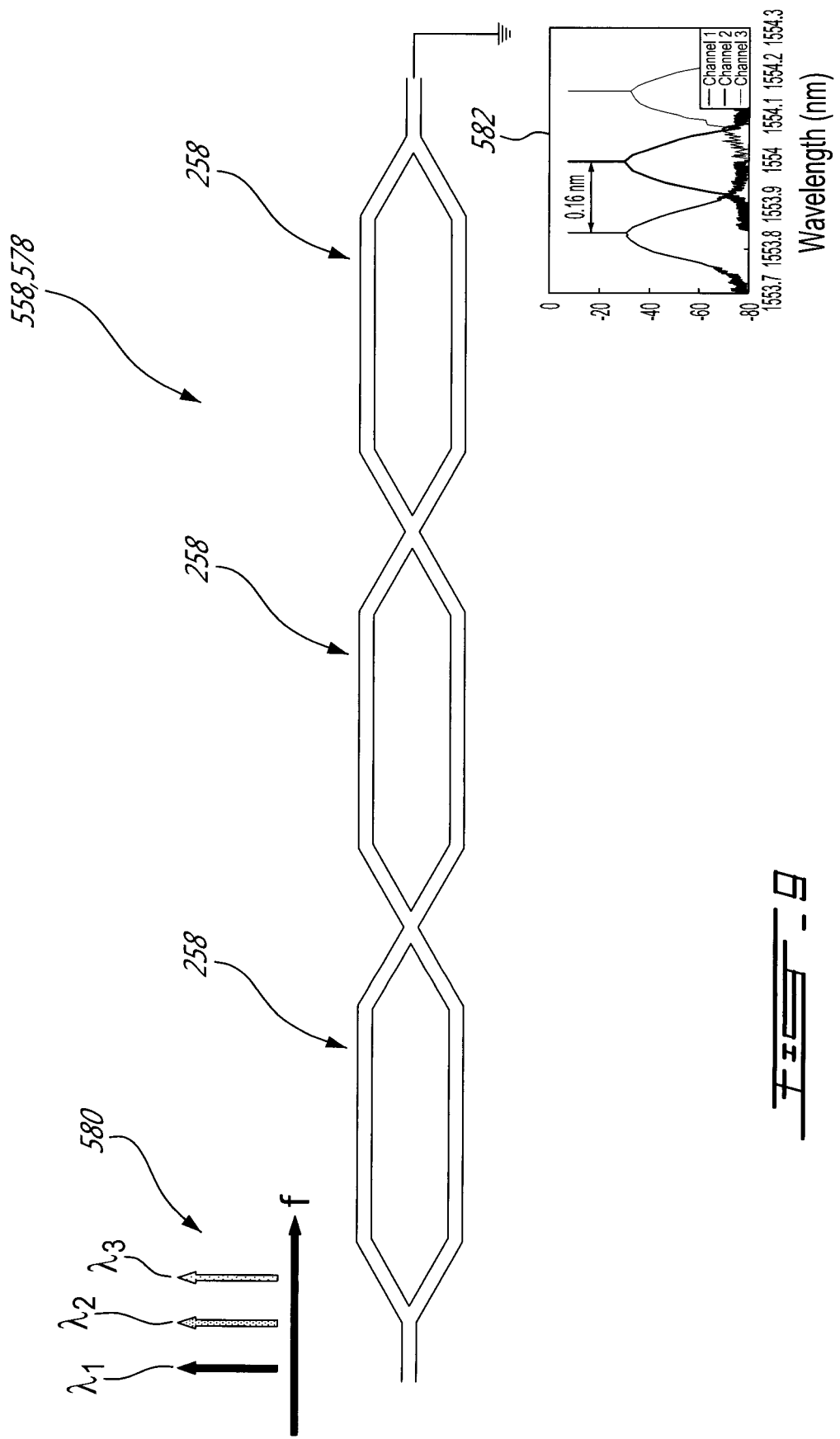
FIG. 9 is a top plan view of an example of a wavelength-division multiplexer including three optical modulators connected in series to one another.

FIG. 1 shows an example of an optical interconnect system 100, in accordance with an embodiment. As depicted, the optical interconnect system 100 has a first photonic chip 102 which is communicatively coupled to a second photonic chip 104 via an optical fiber cable 106.

On the transmitter side, the first photonic chip 102 has an optical source 108 generating an optical signal along a semiconductor waveguide 110, an optical phase modulator 112 encoding data into the optical signal propagating along the semiconductor waveguide 110, and coupling means 114 to couple the encoded optical signal into an end 106a of the optical fiber cable 106.

On the receiver side, the second photonic chip 104 has coupling means 116 to couple the encoded optical signal received from the other end 106b of the optical fiber cable 106 along a semiconductor waveguide 118 leading to an optical detector 120, which reproduces the data from the received optical signal.

As discussed above, both photonic chips 102 and 104 include photonic components which are manufactured using conventional semiconductor fabrication processes to allow mass production at low costs.

In the illustrated embodiment, the first and second photonic chips 102 and 104 are silicon photonic chips. More specifically, each of the photonic chips 102 and 104 has a semiconductor substrate 122 provided in the form of a silicon-on-insulator (SOI) substrate. The SOI substrate typically has a silicon base layer 124, an insulator layer 126 mounted on the silicon base layer 124, the semiconductor waveguide 110 being mounted on the insulator layer 126, and a cladding layer 128 mounted on the insulator layer 126 and on the semiconductor waveguide 110. As shown, in this embodiment, the semiconductor waveguide 110 is made of silicon and is provided in the form of a ridge waveguide 130. However, as can be understood, other types of photonic chips can be used.

FIG. 2 shows an example of the optical phase modulator 112 shown in FIG. 1. As shown, the optical phase modulator 112 has a semiconductor substrate 122. A semiconductor waveguide 110 is mounted to the semiconductor substrate 122 and extends along a path 132 of the semiconductor substrate 122. In this specific example, the path 132 is a longitudinal path extending parallel to a plane 133 of the semiconductor substrate 122. As shown, the semiconductor waveguide 110 has a first series of phase shift units 134 distributed along the semiconductor waveguide 110. Each phase shift unit 134 has two Bragg gratings 136 being spaced apart from one another along the path 132 and a cavity 138 between the two spaced-apart Bragg gratings 136.

The optical phase modulator 112 has a modulation circuit 135 configured for driving a length of the series of phase shift units 134 of the semiconductor waveguide 110 in accordance with a modulation signal. Accordingly, a refractive index of the semiconductor waveguide 110 can be modulated, which in turns induces a phase shift to an optical signal propagating along the semiconductor waveguide 110.

The modulation signal is generally an electrical signal which carries data in the form of bits. By driving the semiconductor waveguide 110 of the optical phase modulator 112 in accordance with the modulation signal, the data carried by the modulation signal can be encoded into the optical signal via phase modulation, which can be decoded on the receiver side to reconstruct the original data.

The cavity 138 of each phase shift unit 134 induces a corresponding phase shift to the optical signal passing therein. Moreover, as each cavity 138 is surrounded by two Bragg gratings 136, a photon passing through the cavity 138 can be reflected back towards the cavity 138 via reflection on one of the two Bragg gratings 136, and can then be reflected back towards the cavity 138 via reflection on the other one of the two Bragg gratings 136, and so forth, until it escapes towards a downstream one of the phase shift units 134 where such resonance occurs again. The back and forth reflections collectively form a resonance phenomenon in which the photon experiences a phase shift at each time it passes through the cavity 138.

As discussed above, this resonance effect tends to enhance the first-order dispersion of the semiconductor waveguide 110 which in turn enhances its group index. As the effective propagation speed of the photon in the semiconductor waveguide 110 is given by the speed of light in vacuum divided by the group index, the effective propagation speed can thus be greatly reduced, thereby allowing phase modulation to be more efficient and sensitive to the modulation signal.

In some embodiments, each cavity 138 of the phase shift units 134 is a pi-phase shift cavity 140. Accordingly, as the optical signal propagates through the pi-phase shift cavity 140, it experiences a phase shift of pi, i.e., half a period, so as to maximize the phase shift that can be experienced by each photon.

It is noted that the cavity 138 of each phase shift unit 134 is designed so that they have a low quality factor. In this way, the bandwidth of the optical phase modulator 112 can be sufficiently high. In this example, the cavity 138 of each phase shift unit 134 can have a longitudinally extending rectangular cross-section. However, it will be understood that the cavity 138 can have any suitable shape. For instance, the cavity 138 can have a curved, arcuate or sinusoidal shape.

In some embodiments, such as the one shown in FIG. 2, the phase shift units 134 are longitudinally adjacent to one another. In such embodiments, the phase shift units 134 can be said to be highly coupled to one another. Highly coupled phase shift units can enhance the resonance phenomenon. However, in some other embodiments, the phase shift units 134 are longitudinally spaced apart from one another. In these specific embodiments, the phase shift units 134 can be said to be poorly coupled to one another or even uncoupled.

FIG. 3A shows an example of a Bragg grating 136 of the phase shift unit 134 of the optical phase modulator 112 of FIG. 2. As depicted, the Bragg grating 136 includes a plurality of longitudinally spaced-apart corrugations 142 each protruding from the semiconductor waveguide 110 in a manner perpendicular to the path 132 and along the plane 133 of the semiconductor substrate 122. In the illustrated example, the corrugations 142 are shown as having a step-like shape whereas the semiconductor waveguide 110 has a wider dimension d1 at the corrugations 142 and a narrower dimension d2 (d2<d1) in-between the corrugations 142. However, in some other embodiments, the corrugations 142 can have any other suitable shape. For instance, the corrugations 142 can have a curved, arcuate or sinusoidal shape as the corrugations 142 extend along the path 132.

FIG. 3B shows another example of a Bragg grating 136' of the phase shift unit 134 of the optical phase modulator of FIG. 2. As illustrated, the Bragg grating 136' includes a plurality of apertures 142' across the semiconductor waveguide 110 where each of the apertures 142' are spaced apart from one another along the path 132. Such apertures 142' can be referred to as one-dimensional photonic crystal.

FIGS. 4A-D show cross-sectional views of different embodiments of the optical phase modulator 112.

More specifically, FIG. 4A shows an example of an optical phase modulator 112 having a modulation circuit 135 including anode and cathode terminals 144 and 146. The anode and cathode terminals 144 and 146 each extend along a respective one of two opposite sides of the semiconductor waveguide 110. In this way, a voltage source 148 electrically connected to the anode and cathode terminals 144 and 146 can perform the modulation by driving the first series of phase shift units 134 of the semiconductor waveguide 110. In this embodiment, the variation of refractive index can be achieved via Pockels effect.

FIGS. 4B and 4C show examples of an optical phase modulator 112 having a modulation circuit including anode and cathode terminals 144 and 146 such as the ones shown in FIG. 4A. In these specific embodiments, the semiconductor waveguides 110 have p-doped and n-doped semiconductor regions 150 and 152. The p-doped and n-doped semiconductor regions 150 and 152 define a junction 154 extending longitudinally along the semiconductor waveguide 110. These embodiments can be referred as PN junctions. As shown in the embodiment of FIG. 4B, the junction 154 is perpendicular to the plane 133 of the semiconductor substrate 122 whereas in the embodiment of FIG. 4C, the junction 154 is parallel to the plane 133 of the semiconductor substrate 122. In both of these embodiments, the anode and cathode terminals 144 and 146 are electrically connected to the n-doped and p-doped semiconductor regions 152 and 150, either directly or indirectly to perform the modulation.

As shown, the semiconductor waveguide 110 can have heavily p+-doped and n+-doped regions 150' and 152', and even more heavily p++-doped and n++-doped regions 150" and 152" to increase the efficiency at which the semiconductor waveguide 110 can be modulated. As can be understood, the p++-doped region 150" has a higher density of holes than that of the p+-doped region 150', which in turn has a higher density of holes than that of the p-doped region 150. Similarly, the n++-doped region 152" has a higher density of electrons than that of the n+-doped region 152', which in turn has a higher density of electrons than that of the n-doped region 152.

In FIG. 4D, the semiconductor waveguide 110 has an intrinsic region 156 extending between the p-doped and n-doped regions 150 and 152, which can be referred as a PIN junction.

Depending on the embodiment, the modulation circuit 135 can be configured to reverse or forward bias the semiconductor waveguide 110. For instance, the PN junctions 154 shown in FIGS. 4B and 4C can be reversed biased whereas the PIN junction 154 shown in FIG. 4D can be forward biased.

FIGS. 5-8 show different uses of the optical phase modulator 112.

More specifically, FIG. 5 shows an example of an optical modulator 158 in a Mach-Zehnder configuration. As depicted in this embodiment, the optical modulator 158 has a semiconductor substrate 122, a semiconductor waveguide 110 which extends along the semiconductor substrate 122. As shown, the semiconductor waveguide 110 has an input portion 160 leading to first and second arm portions 162 and 164 connected in parallel to one another. In this example, a first coupler 161 couples the input portion 160 to the first and second arm portions 162. The first coupler 161 can be provided in the form of a directional coupler, a power splitter and any other suitable coupling structure. Each of the first and second arm portions 162 and 164 extends along a respective path 132 in this embodiment. The first and second arm portions 162 and 164 combine, at a second coupler 163, to one another into at least one output portion 166.

As shown, the first arm portion 162 has a first series of phase shift 134 units distributed therealong where each phase shift unit 134 having two Bragg gratings 136 which are spaced apart from one another the path 132 and a cavity 138 between the two spaced-apart Bragg gratings 136. As such, the optical modulator 158 incorporates the optical phase modulator 112 in this example.

A modulation circuit 135 is also provided for driving a length of the first series of phase shift units 134 of the first arm portion 162 of the semiconductor waveguide 110 in accordance with a first modulation signal.

With such a Mach-Zehnder modulator, modulating the phase of the optical signal propagating in the first arm portion 162 can result in amplitude modulation once the optical signal propagating in the first arm portion 162 recombines with the optical signal propagating in the second arm portion 164 via constructive/destructive interference.

As discussed above, as the amplitude modulation depends on the length and refractive index of both the first and second arm portions 162 and 164, which can typically vary together as temperature fluctuates, the resulting Mach-Zehnder optical modulator 158 is temperature-independent on a given temperature range. Therefore, as long as the Mach-Zehnder optical modulator 158 is operated in the given temperature range, the energy consumption to control the temperature of the Mach-Zehnder optical modulator 158 is likely to be minimal, thus reducing energy consumption.

One or more temperature controllers 168 can be provided along each or both of the first and second arm portions 162 and 164 of the semiconductor waveguide 110. These temperature controllers 168 can be used to set an operating point of the optical modulator 158 or, additionally or alternately, keep the optical modulation within its given temperature range.

FIG. 6 shows another example of an optical modulator 258 in a Mach-Zehnder configuration. As shown, the optical modulator 258 is similar to the optical modulator 158 described with reference to FIG. 5. Similar elements will thus be denoted using similar reference numerals, but in the 200 series. However, as depicted in this embodiment, the second arm portion 264 has a second series of phase shift units 234 distributed therealong where each phase shift unit 234 having two Bragg gratings 236 which are spaced apart from one another along the path 232 and a cavity 238 between the two spaced-apart Bragg gratings 236. Accordingly, the second series of phase shift units 234 can form an optical phase modulator 212 extending along the second arm portion 264 similar to the optical phase modulator 212 extending along the first arm portion 262.

In this specific embodiment, the modulation circuit 235 can be configured for driving a length of the second series of phase shift units 234 of the second arm portion 264 in accordance with the first modulation signal which is also used to drive a length of the first series of phase shift units 234 of the first arm portion 262. Accordingly, only one voltage source 248 is required. In this specific embodiment, the modulation circuit 235 is such that both the first and second arm portions 262 and 264 are driven simultaneously in opposite directions so that the total phase shift can be doubled. In this example, the modulation circuit 235 is configured to provide a bias voltage Vbias to the first and second arm portions 262 and 264, which can be useful for setting an operating status of the optical modulator 258. In this context, the bias voltage is direct current (DC) whereas the modulation signal is alternating current (AC).

However, in some other embodiments, the modulation circuit 235 can be configured for driving a length of the second series of phase shift units 234 of the second arm portion 264 of the semiconductor waveguide 210 in accordance with a second modulation signal which is different from the first modulation signal with which the length of the first series of phase shift units 234 is driven.

FIG. 7 shows an example of an optical modulator 358 in a Mach-Zehnder configuration. As shown, the optical modulator 358 is similar to the optical modulator 258 described with reference to FIG. 6. Similar elements will thus be denoted using similar reference numerals, but in the 300 series. As illustrated, the optical modulator 358 has a semiconductor substrate 322, a semiconductor waveguide 310 which extends along the semiconductor substrate 332. The semiconductor waveguide 310 has an input portion 360 coupling, at a first coupler 361, into first and second arm portions 362 and 364 connected in parallel to one another. Each of the first and second arm portions 362 and 364 extends along a respective path 332 in this embodiment. The first and second arm portions 362 and 364 combine to one another into at least one output portion 366.

As shown, the first arm portion 362 has a first series 334a of phase shift units 334 distributed therealong and a third series 334c of phase shifts units 334 distributed therealong, where the first series 334a is longitudinally spaced apart from the third series 334c along the path 332. In this way, the first series 334a of phase shift units 334 forms a first optical phase modulator 312a which is in series to a third optical phase modulator 312c, which is in turn itself formed by the third series 334c of phase shift units 334.

Similarly, the second arm portion 364 has a second series 334b of phase shift units 334 distributed therealong and a fourth series 334d of phase shifts units 334 distributed therealong, where the second series 334b is longitudinally spaced apart from the fourth series 334d along the path 332. Again, the second series 334b of phase shift units 334 forms a second optical phase modulator 312b which is in series to a fourth optical phase modulator 312d, which is in turn itself formed by the fourth series 334d of phase shift units 334.

In this embodiment, the modulation circuit 335 is configured for providing a first modulation signal but in opposite directions to the first series 334a of phase shift units 334 and to the second series 334b of phase shifts units 334 and for providing a second modulation signal but in opposite directions of the third series 334c of phase shift units 334 and to the fourth series 334d of phase shift units 334.

In this way, the optical modulator 358 of FIG. 7 can be used for pulse-amplitude modulation (PAM), and more specifically for 4-PAM. In this configuration, the first modulation signal can dictate the least significant bit whereas the second modulation signal can dictate the most significant bit.

As can be understood, other variants of the optical modulator 358 can be used for 16-PAM, 64-PAM and the like in other embodiments.

As depicted, temperature controllers 368 are provided in each of the first and second arm portions 362 and 364 in this embodiment.

FIG. 8 shows an example of an optical modulator 458 in a Mach-Zehnder configuration. As shown, the optical modulator 458 is similar to the optical modulator 358 described with reference to FIG. 7. Similar elements will thus be denoted using similar reference numerals, but in the 400 series. As illustrated, the optical modulator 458 has a semiconductor substrate 422, a semiconductor waveguide 410 which extends along the semiconductor substrate 422. The semiconductor waveguide 410 has an input portion 460 coupling into first, second, third and fourth arm portions 462, 464, 470 and 472 connected in parallel to one another. Each of the first, second, third and fourth arm portions 462, 464, 470 and 472 extends along a respective path 432 in this embodiment. The first, second, third and fourth arm portions 462, 464, 470 and 472 combine to one another into at least one output portion 466.

As shown, the first arm portion 462 has a first series 434a of phase shift units 434 distributed therealong, the second arm portion 464 has a second series 434b of phase shift units 434 distributed therealong, the third arm portion 470 has a third series 434c of phase shift units 434 distributed therealong, and the fourth arm portion 472 has a fourth series 434d of phase shift units 434 distributed therealong.

In this embodiment, the modulation circuit 435 is configured for providing a first modulation signal but in opposite directions to the first series 434a of phase shift units 434 and to the second series 434b of phase shifts units 434 and for providing a second modulation signal but in opposite directions of the third series 434c of phase shift units 434 and to the fourth series 434d of phase shift units 434.

In this embodiment, temperature controllers 468 can be provided in each of the first, second, third and fourth arm portions 462, 464, 470 and 472. Alternately or additionally, temperature controllers 468 can be provided downstream from the recombination of the arm portions 462, 464, 470 and 472. Auxiliary output portions 474 can be provided downstream from said recombination.

Accordingly, in this embodiment, the optical modulator 458 can be used as an IQ modulator for quadrature amplitude modulation (QAM). FIG. 8A is a schematic view of an IQ coherent modulator 476 incorporating the optical modulator 458 of FIG. 8. FIG. 8B is a graph showing IQ amplitudes that can be obtained by the IQ coherent modulator 474.

FIG. 9 shows an example of an optical modulator 558 incorporating a plurality of the optical modulators 258 which are connected in series to one another to provide a wavelength-division multiplexing (WDM) transmitter 578. In these embodiments, each of the optical modulators 258 modulates a corresponding one of a plurality of optical signals having power at spectrally spaced-apart optical wavelengths A1, A2 and A3, such as shown in input spectrum 580. An example of an output spectrum is shown at 582. In alternate embodiments, it is envisaged that by using optical frequency combs, there would be no need for multiplexers (MUX) or demultiplexers (DEMUX).

Example 1—High Efficient Silicon Photonic Modulator with Wide Optical Bandwidth

Nowadays, an increasing demand for high-speed communication has been created. Optical communication has been the only solution so far by which a great chance is generated to meet required speed. Electro-optic (EO) modulator is one of the essential parts of optical communication and its design has been playing a critical role to provide requirements of optical interconnects. In fact, designing of an EO modulator can remain an attractive topic in optical researches, until there can be a trend towards to obtaining transmission with high speed.

Silicon photonic (SiP) modulators present low-cost component and are compatible with CMOS technology, but at cost of reduced EO effects. In silicon, there is no linear EO effect. Furthermore, quadratic EO effect and electro-absorption effect are both extremely weak. Plasma dispersion effect is not also a strong effect in silicon, but it is the dominated phenomenon to change refractive index of silicon. For example, SiP based Mach-Zehnder (MZ) modulator that combined to travelling waveguide, called conventional MZM, suffers from low modulation efficiency, resulting in high power consumption and long length of phase shifter. Notwithstanding these drawbacks, such modulator can provide a temperature-free operation due to wide optical bandwidth, and small pulse chirp when operated with push pull configuration. Resonator-based SiP modulator (RBM), in contrast of conventional MZM, has a compact footprint and low power consumption. The reason is that resonance phenomenon in cavity can lead to phase shift being much more sensitive to applied voltage, resulting in sharply increased modulation efficiency. However, RBMs generate very chirpy pulse and are unstable against variations of temperature because of narrow optical bandwidth. It is worth pointing out that the active stabilization in micro ring modulator (MRM) requires significantly more energy consumption in comparison to the energy that needs to be consumed for modulator driver.

Both types of the aforementioned SiP modulators have pros and cons. They themselves may not meet the desirable requirements of optical interconnects, while a compound of them would be able to. In some papers, a ring resonator is implemented to each arm of MZ to increase phase efficiency. It makes the device compact, but with the sacrifice of optical bandwidth, resulting in significantly raised sensitivity to temperature. To overcome bandwidth limitation, separated-cascaded rings have been proposed to be inserted at each arm. However, this design suffers from free spectrum range (FSR) limitation. As well as the rings, photonic crystal waveguides are used at each arm of MZ to achieve modulation enhancement. On the one hand the fabrication process is one challenge for this design. On the other hand sensitivity to voltage remains in high level.

In this example, a design of SiP modulator whose properties are between the conventional MZM's and RBM's properties is proposed. One purpose is to reach a compromise between high modulation efficiency of MRM and wide optical bandwidth of conventional MZM by incorporating coupled resonators in phase shifters of MZ so that the resonators are used in low-dispersion slow light (LDSL) regime. As will be discussed, this design can enhance delay-bandwidth product which is the fundamental limit in slow light based device. High delay time, corresponding to large group index, offers modulation enhancement. Furthermore, wide optical bandwidth results in low sensitivity to temperature. As a consequence, such design is more stable and has larger operating temperature range than MRM, and in comparison to conventional MZM, it has lower peak to peak ($V_{pp}$) voltage and more compact footprint. The simulation results show that the modulator described herein can obtain modulation efficiency of $V_\pi \times L < 0.3$ Vcm while the optical bandwidth is >3 nm. Because of these properties, operating temperature range of this modulator is ~50 K, at the same time, the length of each arm is $L < 60$ μm.

When the light propagates through the silicon waveguide, its speed is $c/n_g$ where $c = 3 \times 10^8$ is velocity of light in vacuum and $n_g$ is group index that is equal to ~4 for rib-waveguide. Controlling light with such speed is difficult, especially in silicon whose EO effects are weak, resulting in reduced efficiency. If there is a chance to control speed of light, it can be possible to provide a device not only still with high speed but also with high efficiency. Group index depends on the first-order of dispersion. This dispersion can be sharply enhanced with resonance phenomenon, created by either material or structure. For SiP device, resonance can be produced just by structure because silicon is not remarkably dispersive material. Ring resonators, photonic crystal, and Bragg grating are structures that can introduce resonance phenomenon, resulting in slowed light in band gap. The cost associated with beneficial attributes of slow light is the increase of second-order dispersion, making group velocity dispersion larger or optical bandwidth narrower. Therefore, how to use slow light in modulator plays a critical role to meet requirements of optical interconnect, such as stability, high speed, compact size, and low energy consumption.

In modulators based on slow light, low group velocity (or large $n_g$) makes phase shift to be more sensitive to applied voltage, however it comes at the price of raised sensitivity to temperature so that the operational temperature range is just a few kelvins. In general, slow light however associated with modulation enhancement, suffers from narrow optical bandwidth. This can be overcome by controlling the slow light, achieved by structure modification. In the present case, the cascaded resonators offer an opportunity in which cavities are designed with low quality factor to make wide optical bandwidth, while maintaining efficiency high. In other words, to provide wider optical bandwidth, each resonator is biased in LDSL regime; thereafter, the larger $n_g$ can be introduced by cascading the coupled resonators. Therefore, not only does modulation efficiency remain same as RBM, but also optical bandwidth can trend towards to conventional MZM with free-temperature operation. Furthermore, in order to keep whole length L of integrated Bragg grating (IBG) quite small when a large number of resonators are inserted, IBG with high photonic band gap should be designed that is obtained by strong grating corrugations.

Cascaded micro ring resonators have been similarly inserted in MZ (MRM-MZM) to increase modulation efficiency. There are three reasons behind the structure of the modulator described herein, showing that this design has a better performance than MRM-MZM. First, single peak over the whole C-band is observed in this design, and thus, there is no FSR limitation which is an important challenge in MRM-MZM. In addition, the optical modulator described herein is formed by coupled-cascaded resonators, causing performance improvement; while MRM-MZM contains the separated-cascaded cavities. Finally, when this design implements with strong corrugations, the footprint area can be very small, which directly contributes to making the design more robust to fabrication variations. In MRM-MZM, it is possible to make the footprint area quite small, but at the expense of raised fabrication error and FSR limitation.

Figure 10A:
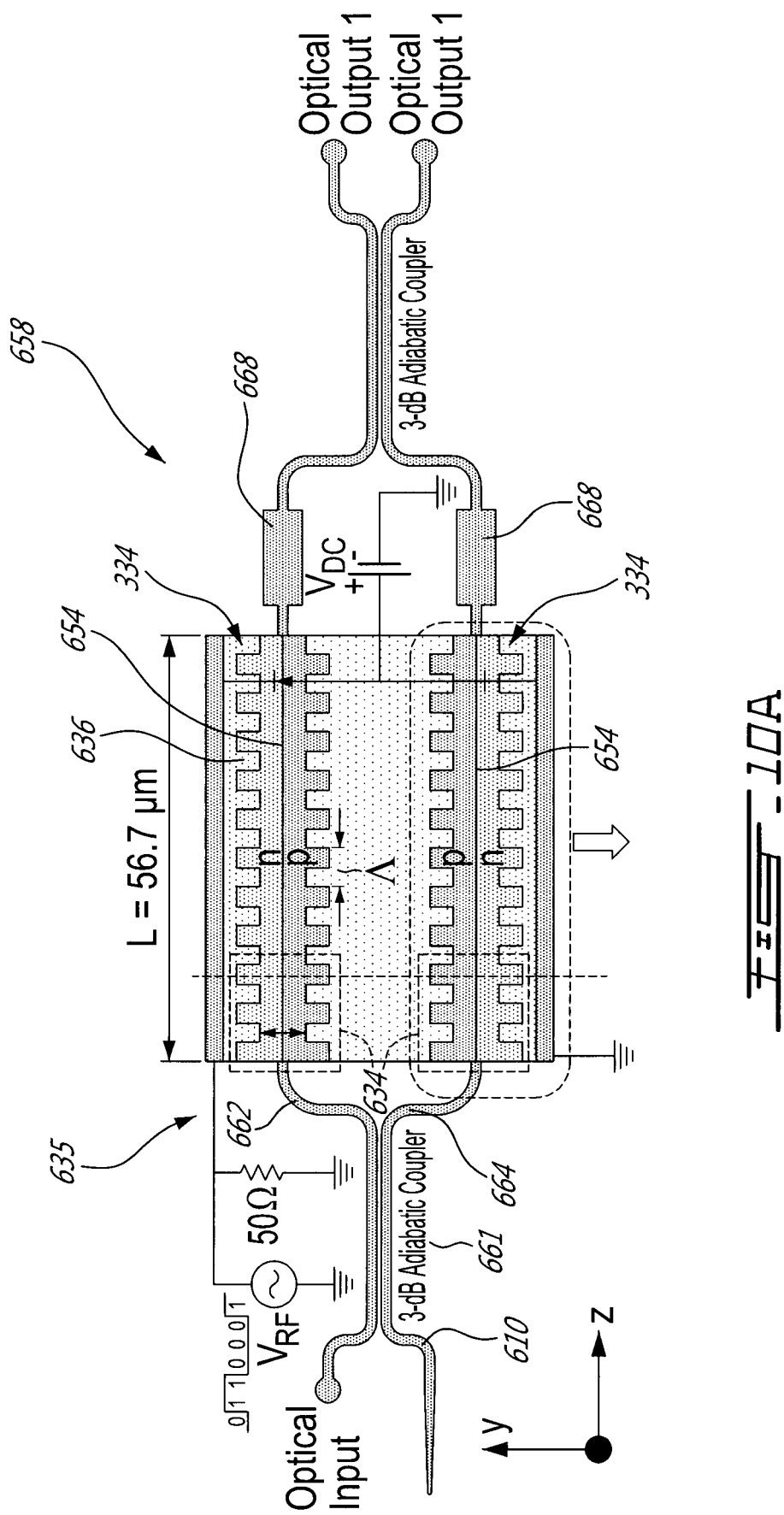
FIG. 10A is a schematic view of another example of an optical modulator having a Mach-Zehnder configuration with a semiconductor waveguide having two arm portions each having a series of phase shift units.
Figure 10E:
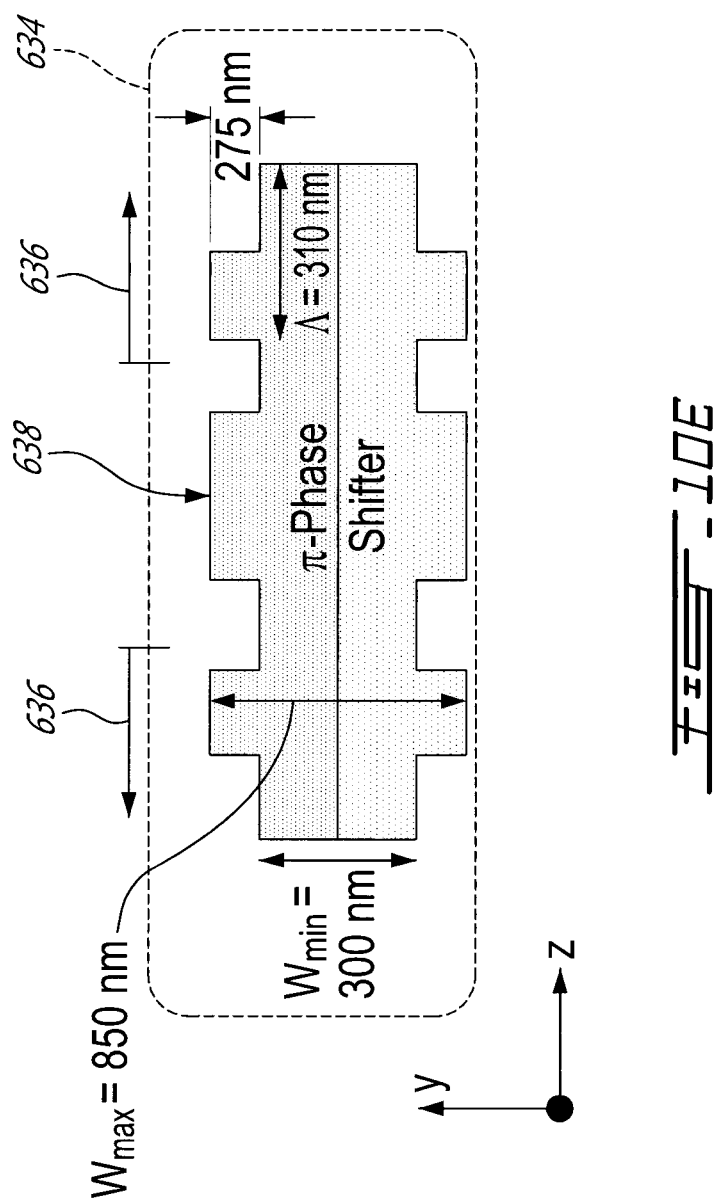
FIG. 10E is an enlarged top view of one of the two arm portions of the semiconductor waveguide of the optical modulator of FIG. 10A.

FIG. 10A shows the configuration of an example of an optical modulator 658. As shown, the optical modulator 658 is similar to the optical modulator 258 described with reference to FIG. 6. Similar elements will thus be denoted using similar reference numerals, but in the 600 series. The optical modulator 658 can be referred to as Bragg grating resonator assisted MZ modulator (BGR-MZM). Bragg gratings 636, having a uniform period of Λ=310 nm, are inserted in each arm portion 662 and 664 at which six π-phase shift units 634 are placed, such as shown in FIG. 10D. 15 periods are provided each side of each cavities 638 in this example.

As can be seen from the example shown in FIGS. 10B to 10E, the Bragg gratings 636 are designed using sidewall corrugations 642 with a duty cycle of 50% in a ridge waveguide 610 having a maximum width $W_{max}$ of 850 nm, a minimum width $W_{min}$ of 300 nm, a ridge height $H_{rib}$ of 130 nm, and a slab height $H_{slab}$ of 90 nm. The total corrugation amplitude and average width are 550 nm and 575 nm, respectively. Single push-pull configuration is considered in order to apply voltage. Temperature controllers 668 are placed in both arms to symmetrize MZ. PN junctions 654 are formed over the entire length of the series of phase shift units 634.

As shown, the semiconductor waveguide 610 can have p-doped and n-doped regions 650 and 652, heavily p+-doped and n+-doped regions 650' and 652', and even more heavily p++-doped and n++-doped regions 650" and 652" to increase the efficiency at which the semiconductor waveguide 610 can be modulated. In this example, the dimensions of these regions are, in this example, as following: X1 is of about 625 nm, X2 is of about 1 µm, X3 of about 0.5 µm, Y1 of about 625 nm, Y2 of about 1 µm, and Y3 of about 0.5 µm. The length L of the arm portions 662 and 664 is of about 56.7 µm in this example.

Figure 11:
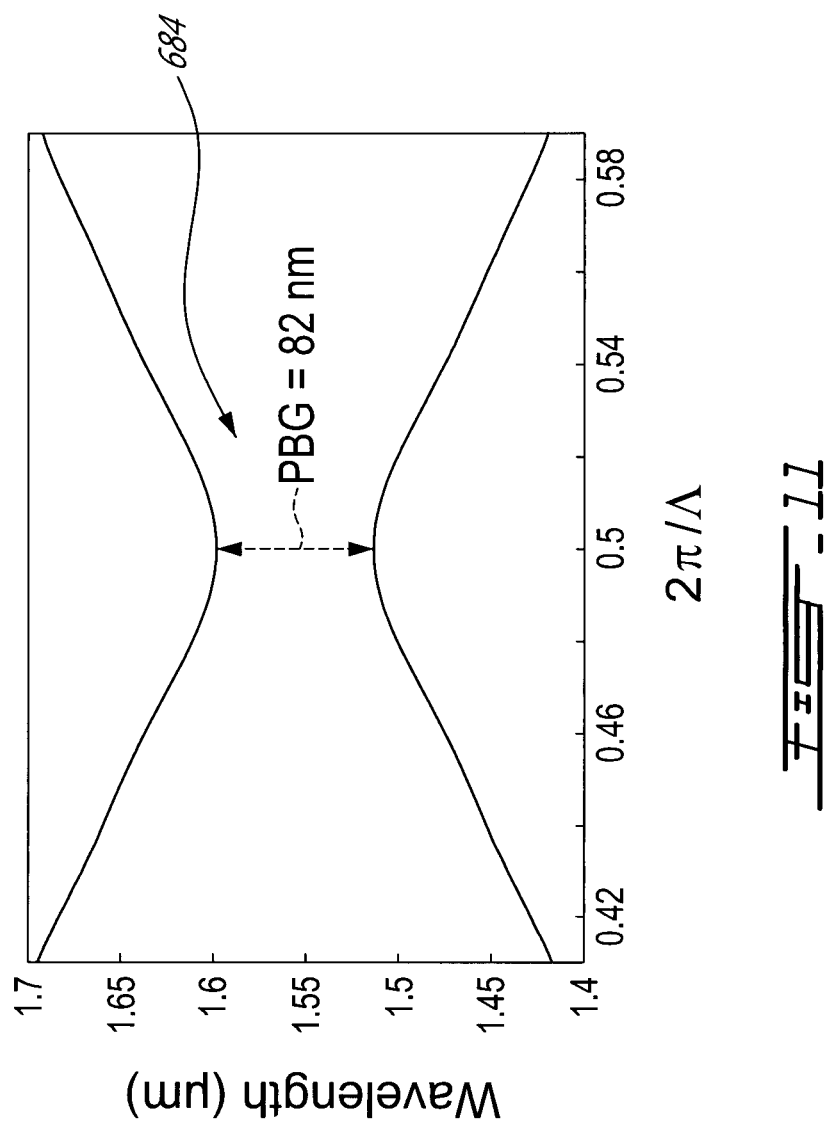
FIG. 11 is a graph showing a band structure of the Bragg grating of FIG. 10D.

Regarding the spectral response of the optical modulator 658. After coupling optical power by a 3-dB adiabatic coupler 661, light traverses through the series of phase shift units 634 in each arm portions 662 and 664. To determine transmission and phase shift of the phase shift units 634, a transfer matrix model is used. κ is defined as grating coupling coefficient. In order to estimate κ, the photonic band gap (ΔλPBG) is first calculated by FDTD-Lumerical and then it is provided using:

$$\kappa = \frac{\pi n_g \Delta\lambda_{PBG}}{\lambda_c^2} \quad (1)$$

where $\lambda_c$ is central wavelength of ΔλPBG and $n_g$ is average group index of Bragg grating. FIG. 11 shows a structure of a photonic band gap 684 of the Bragg grating 636 by which coupling coefficient of κ=4023 m$^{-1}$ is calculated, corresponding to ΔλPBG of 82 nm.

The purpose behind using IBG with high photonic band gap is that number of period which is needed to provide a 3.15 nm 3-dB optical bandwidth decreases, resulting in an extremely short IBG length of L=56.7 µm and thus a low modulation power. In other words, keeping grating strength (κ×L) high when length of IBG is reduced. It is noteworthy that a Bragg grating with strong corrugations can raise radiation loss, and consequently, the loss per length. However, the total loss of the modulator described herein is in reasonable range since the length of IBG is quite small. The optical modulator described herein without considering modulation loss (ML) presents 1.16 dB loss, corresponding to 206 dB/cm that has been calculated by FDTD-Lumerical.

Figure 12A:
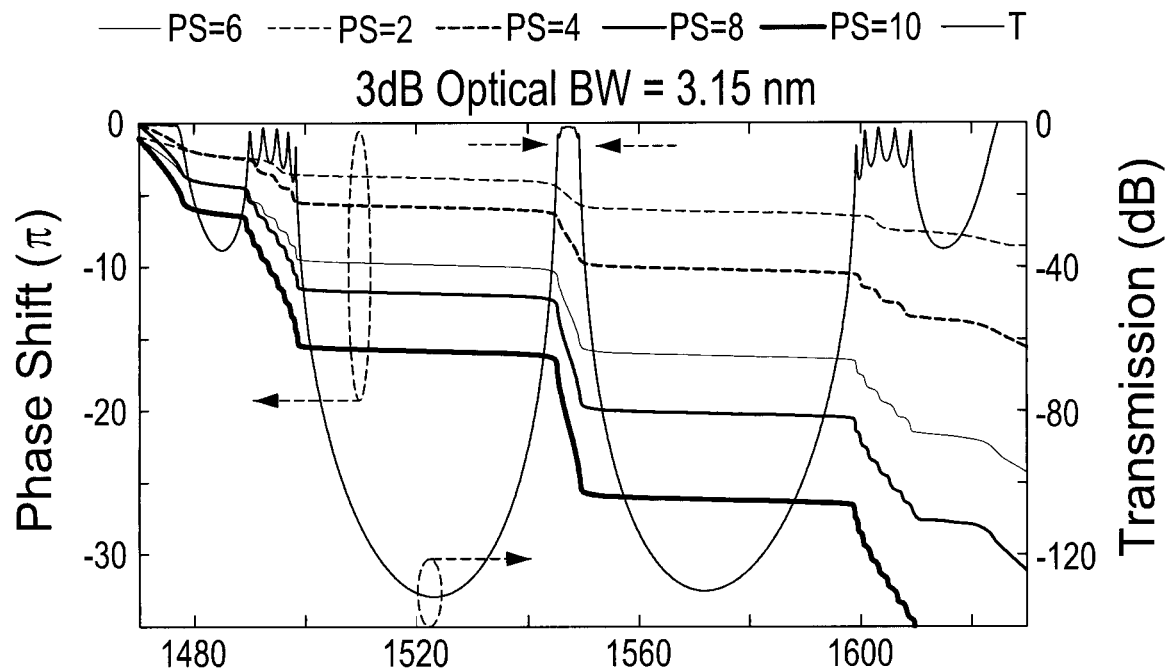
FIG. 12A is a graph showing transmission of the optical modulator of FIG. 10A and phase shifts associated with different numbers of phase shift units of the optical modulator of FIG. 10A.

In static response, there is only one peak of transmission at C-band and its 3-dB optical bandwidth is 3.15 nm, such as shown with reference to the T-curve in FIG. 12A. It is understood that using LDSL regime can improve the modulator stability because of increasing optical bandwidth. The modulation enhancement, which means a lower $V_{pp}$ is needed to achieve the required phase modulation, can be presented if slope of phase shift around operational wavelength (λ0=1547.3 nm) increases. As illustrated from the other curves in FIG. 12A (e.g., PS-2, PS-4, PS-6, PS-8, PS-10 curves), when the number of resonators in the series of phase shift units 634 increases, the linear segment of the transmitted phase spectrum can be sharper, confirming that a strong modulation enhancement is in proportion to the number of cavities 638.

Figure 12B:
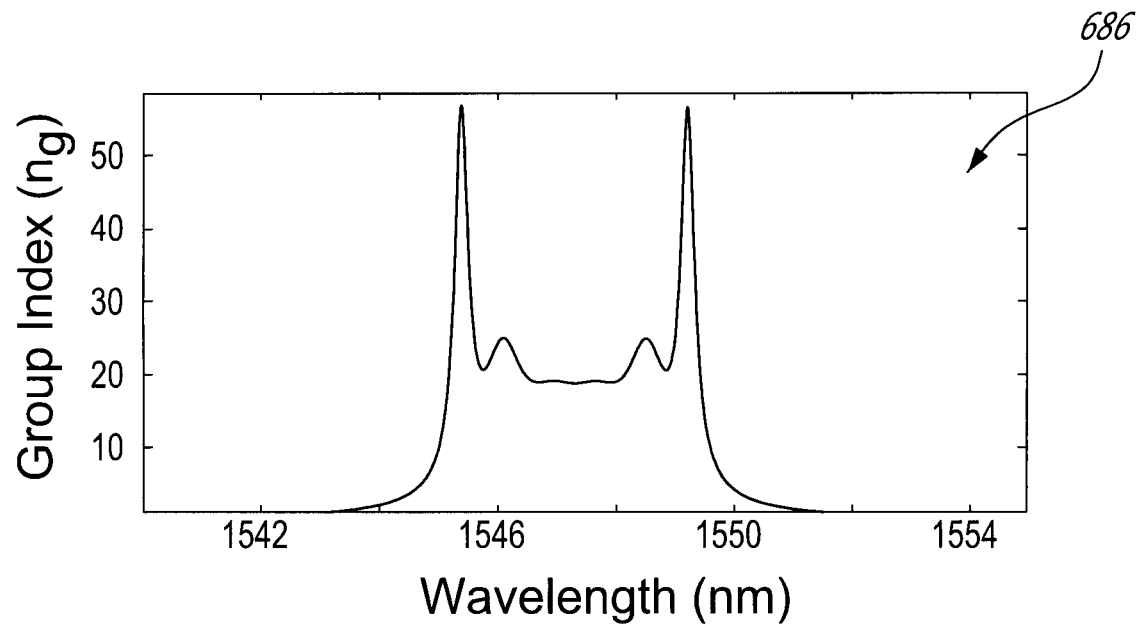
FIG. 12B is a graph showing effective group index as function of wavelength for the optical modulator of FIG. 10A.
Figure 13A:
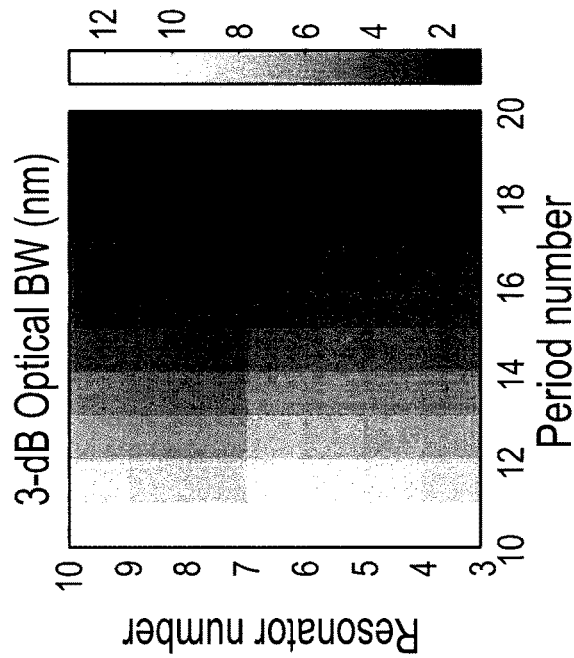
FIG. 13A is a graph showing enhancement factor as function of number of phase shift units and as function of period number for the optical modulator of FIG. 10A.
Figure 13B:
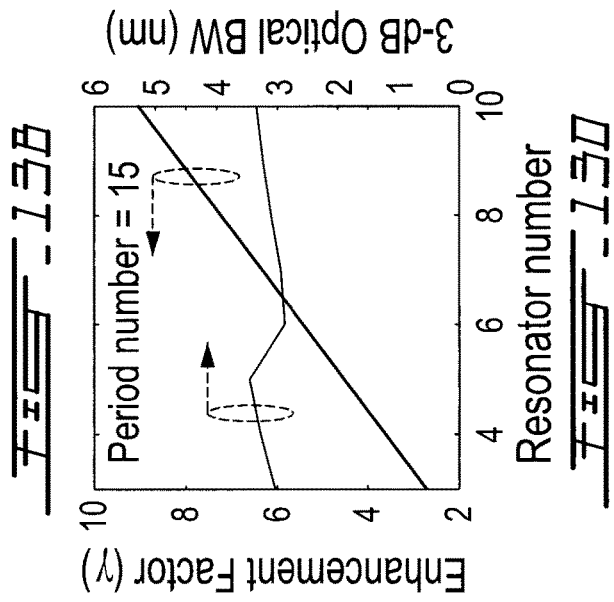
FIG. 13B is a graph showing 3-dB optical bandwidth as function of number of phase shift units and as function of period number for the optical modulator of FIG. 10A.
Figure 13C:
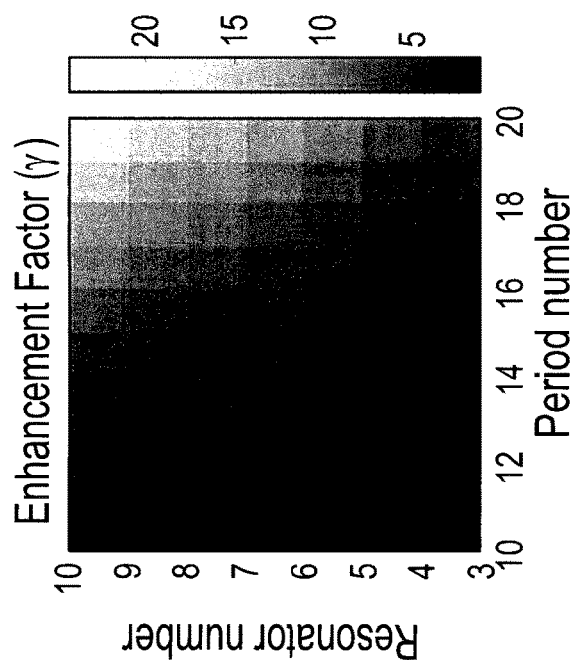
FIG. 13C is a graph showing enhancement factor and 3-dB optical bandwidth as a function of period number for an optical modulator having six phase shift units.
Figure 13D:
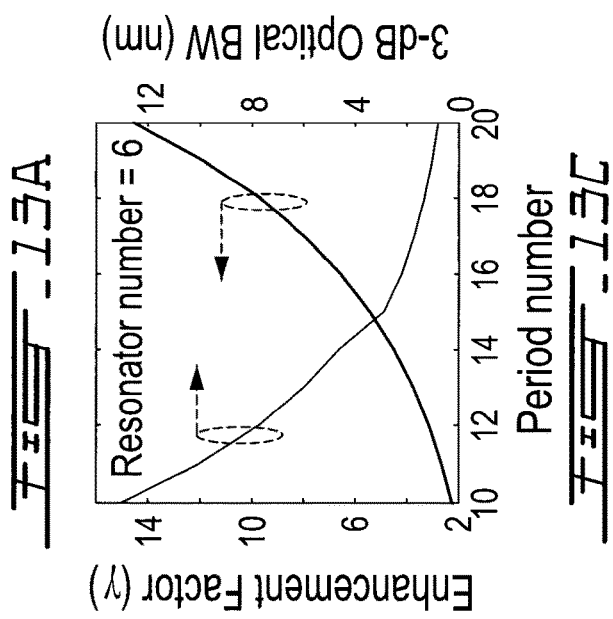
FIG. 13D is a graph showing enhancement factor and 3-dB optical bandwidth as a function of number of phase shift units for an optical modulator having phase shift units with Bragg gratings with a period number of 15.
Figure 14:
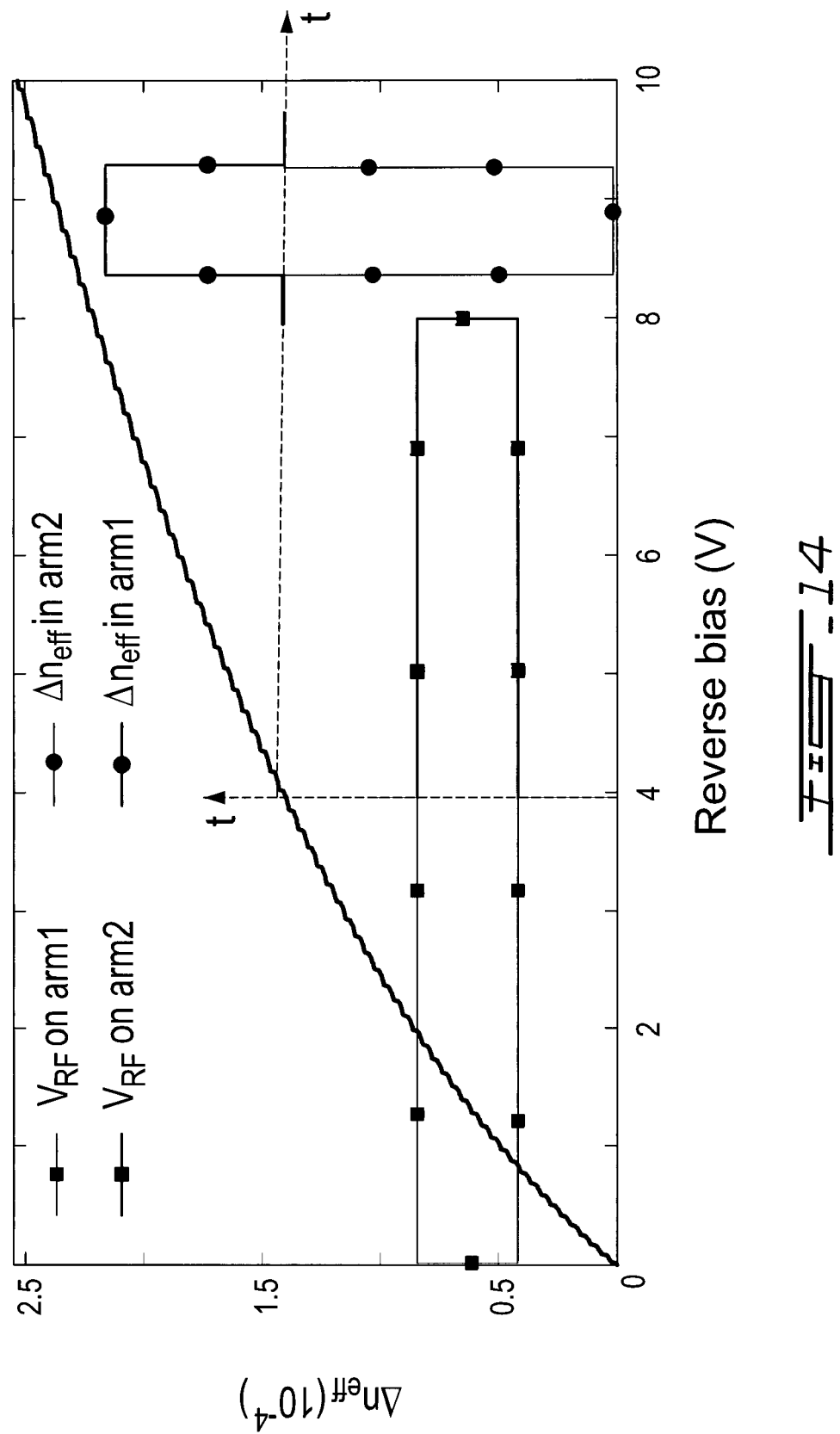
FIG. 14 is a graph showing variation of refractive index as a function of reverse bias voltage as applied to both arm portions of the optical modulator of FIG. 10A.

Regarding effect of slow light in static response, FIG. 12B shows an example of a spectrum 686 of $n_g$ for six phase shift units, showing that $n_g$ at operational wavelength is ~20, being several times larger than $n_g$ of rib-waveguide due to effect of slow light. Furthermore, it can indicate that LDSL regime is used because of flat response around operational wavelength. To quantify the slow light effect, an enhancement factor, γ, is introduced so as to define the ratio between the values of the derivative of the phase with respect to applied voltage for a series of phase shift units 634 with multiple phase-shifts to a simple phase-shifter (waveguide with p-n junction) in the same length. FIG. 12A shows this factor as function of both period number and resonator (i.e., cavity) number. As can be seen, a large number of period obtains more efficient modulator, but at price of reduced 3-dB optical bandwidth because of increasing quality factor of resonators, such as shown in FIG. 12B. Therefore, choosing a good value for period number can play an essential role in the design of the optical modulator 658 because a compromise between the operational temperature range and modulation efficiency can be reached, corresponding to a good value for delay-bandwidth product. FIG. 13C shows an example of such a trade-off. From FIGS. 13A and 13B, it is also understood that the adding resonator makes phase modulation enhanced, of course, 3-dB optical bandwidth remains almost constant, corresponding to enhanced delay-bandwidth product. To be more precise, when the number of resonators is increased, some small ripples appear in amplitude response, nevertheless the changes in the 3-dB optical bandwidth is negligible. FIG. 14 confirms such an assumption. The present modulator introduces enhancement factor of 5.4 and 3-dB optical bandwidth of 3.15 nm using six phase shift units with fifteen periods each side of them.

Figure 15:
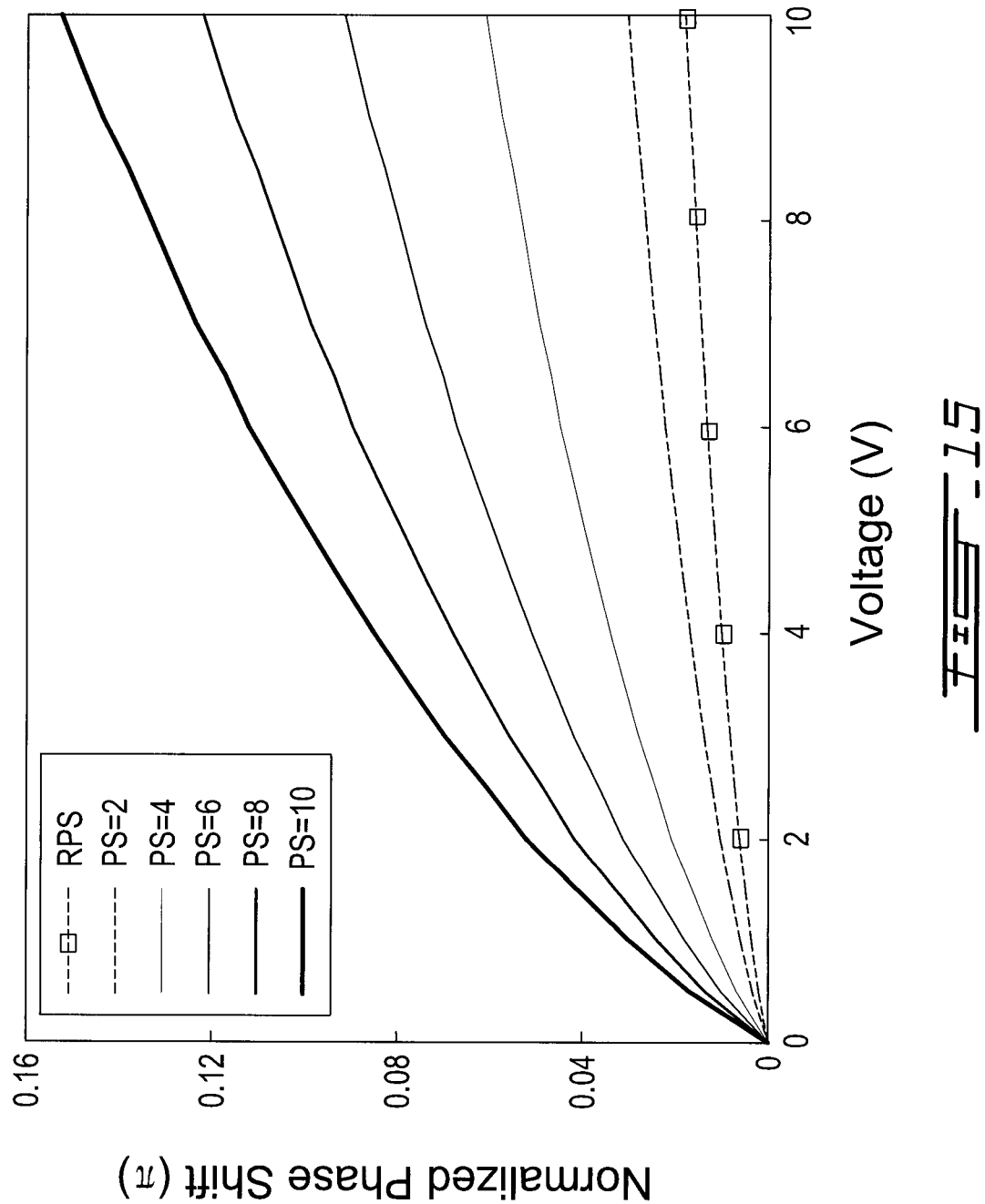
FIG. 15 is a graph showing absolute value of normalized transmitted phase as a function of applied reverse bias voltage for an optical modulator such as the one shown in FIG. 10A and having different numbers of phase shift units.

When voltage is applied to the series of phase shift units, hole and electron concentration in active area are changed, causing variation in the refractive index according to Kramers-Kronig analysis. Applying positive voltage presents higher modulation efficiency in comparison to reverse bias, but at expense of decreased electro-optic bandwidth. Then, reverse bias is mostly used in high speed application. FIG. 14 shows the perturbed refractive index as a function of reverse voltage. As can be seen, the variation value of refractive is small, confirming that plasma dispersion effect in silicon is a week effect in this example. FIG. 15 shows the absolute value of the normalized phase shift as a function of voltage for various numbers of cavities. It is seen that the marked line, corresponding to reference phase-shift (phase shift of simple doped waveguide), has lowest sensitivity to the applied voltage, while the sensitivity is improved by adding effect of resonant phenomenon.

OMA is the difference between maximum ("1") and minimum ("0") output power normalized to input power. The series of phase shift units are integrated into MZ interference (MZI) whose power output can be calculated by the following equation supposing that there are an ideal combiner and splitter in output and input of MZI, respectively.

$$P_{out} = P_{in}\exp(-\alpha L)\cos^2(\Delta\varphi_v) \quad (2)$$

$$\Delta\varphi_v = \frac{k_0 \Delta n_{eff}(V)\gamma L + \Delta\varphi_0}{2} \quad (3)$$

where $P_{in}$ is input power, α presents propagation loss, $k_0$ is wavenumber that is equal to $2\pi/\lambda_0$, and $\Delta\varphi_0$ represents initial phase difference between two arms. Finally, $\Delta n_{eff}$ is variation of refractive index in IBG by applying reverse voltage. OMA normalized by input power in dB is calculated using:

$$OMA = 10\log\left(\frac{\text{Output } Power_{on\_state} - \text{Output } Power_{off\_state}}{\text{Input Power}}\right) \quad (4)$$

Figure 16B:
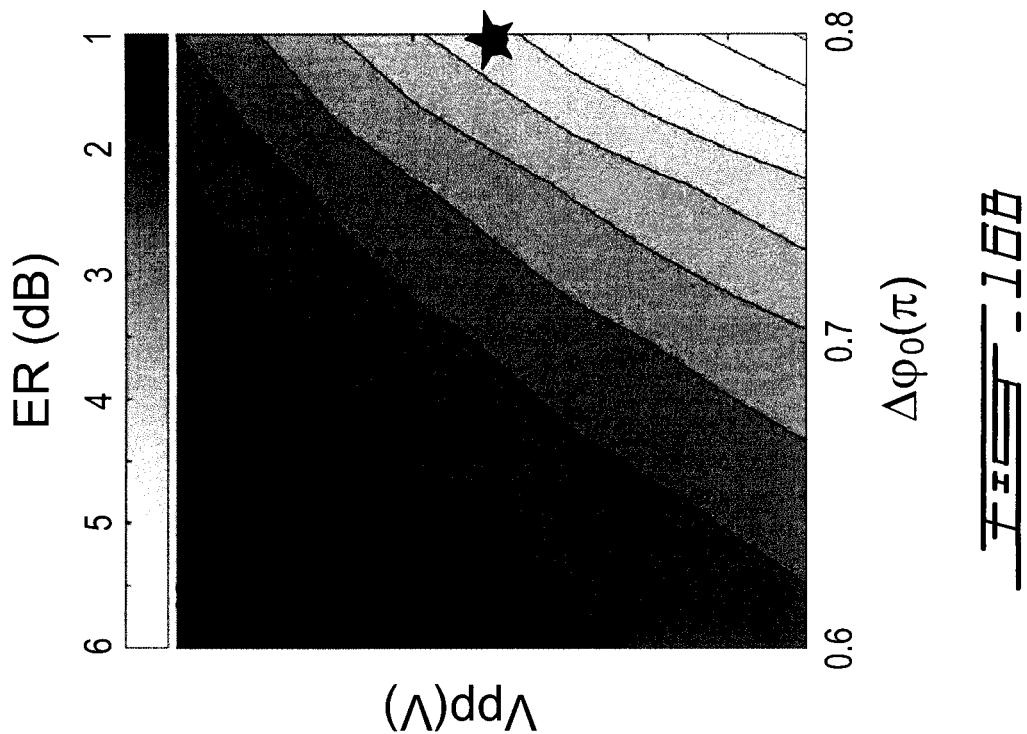
FIG. 16B is a graph showing extinction ratio as function of peak-to-peak reverse bias voltage and as function of initial phase difference between the first and second arm portions of the optical modulator of FIG. 10A.
Figure 16A:
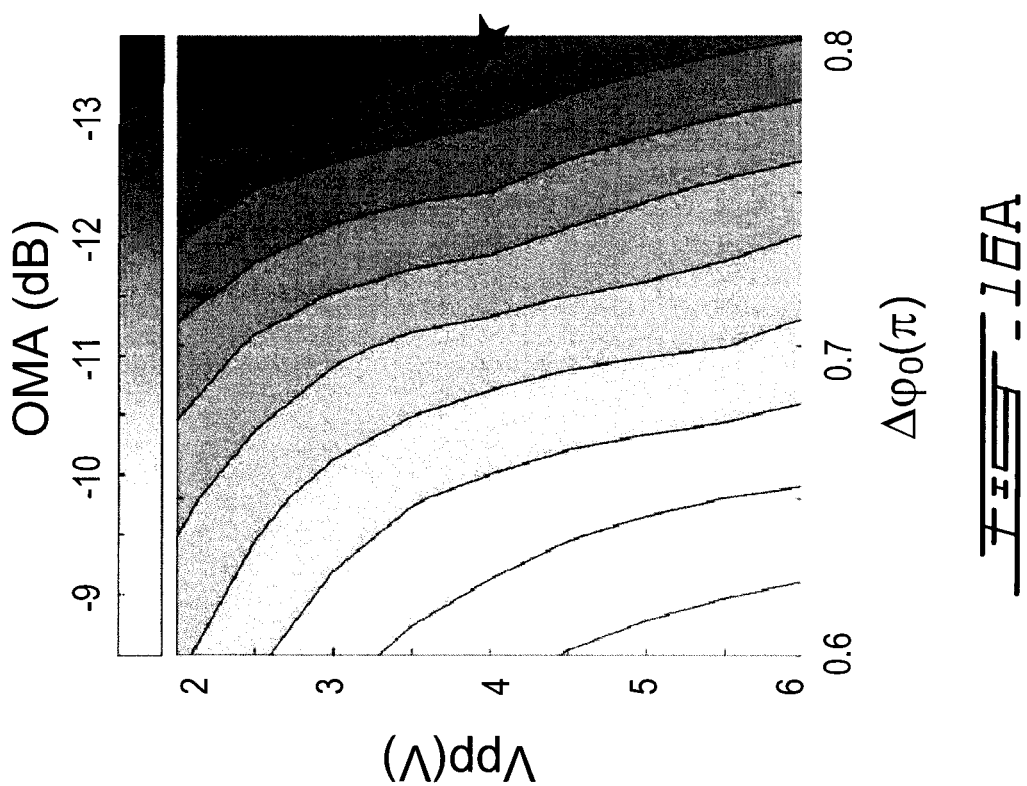
FIG. 16A is a graph showing optical modulation amplitude as function of the peak-to-peak reverse bias voltage and as function of the initial phase difference between the first and second arm portions of the optical modulator of FIG. 10A.

FIGS. 16A and 16B show ER and OMA values at operational wavelength as function of $\Delta\varphi_0$ and $V_{pp}$ on each arm. To provide maximum efficiency, $V_{pp}$ is considered equal to |Vbias| where Vbias is DC bias voltage. It is seen from the figure that difference between output power of "1" and "0" in dB is increased by adding initial phase, but at the expense of introduced larger ML, corresponding to lower OMA at operational wavelength. On the other hand, larger $V_{pp}$ offers both higher ER and lower ML, but with the sacrifice of power consumption. Therefore, there is challenge here between these three parameters to choose bias point and $\Delta\varphi0$. To provide reasonable eye opening, the ER must be larger than 4 dB. As well as this, $V_{pp}$ should be considered as low as possible because of power consumption. To introduce these two items, $\Delta\varphi_0$ of $0.8\pi$ and $V_{pp}$ of 4 V are chosen, shown with black stars in FIGS. 16A and 16B.

Figures 17A, 17B:
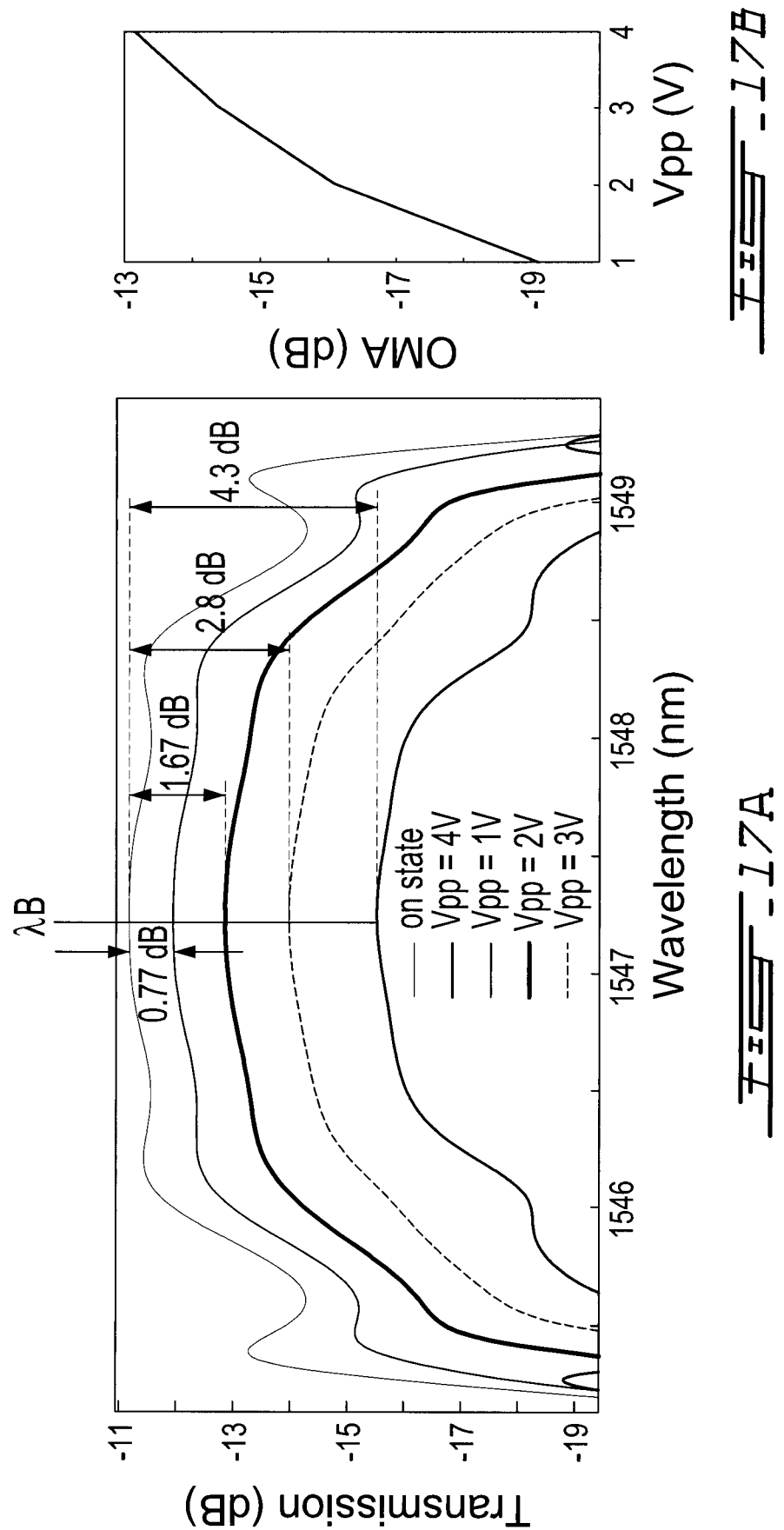
FIG. 17A is a graph showing transmission as function of wavelength for different peak-to-peak reverse bias voltage values when the bias voltage Vbias is −4 Vp.
FIG. 17B is a graph showing optical modulation amplitude as function of peak-to-peak reverse bias voltage values when the bias voltage Vbias is −4 Vp.

FIG. 17A shows the output power of BGR-MZM for various values of $V_{pp}$, using −4 V bias and $\Delta\varphi_0=0.8\pi$ in this example. Single push-pull configuration is considered to apply voltage. As can be seen, the ON/OFF extinction ratio (ER) reaches to 4.3 dB by applying $V_{pp}$ of 4 V. FIG. 17B shows OMA as function of $V_{pp}$, indicating that OMA is increased by applying larger $V_{pp}$.

Figures 18A, 18B:
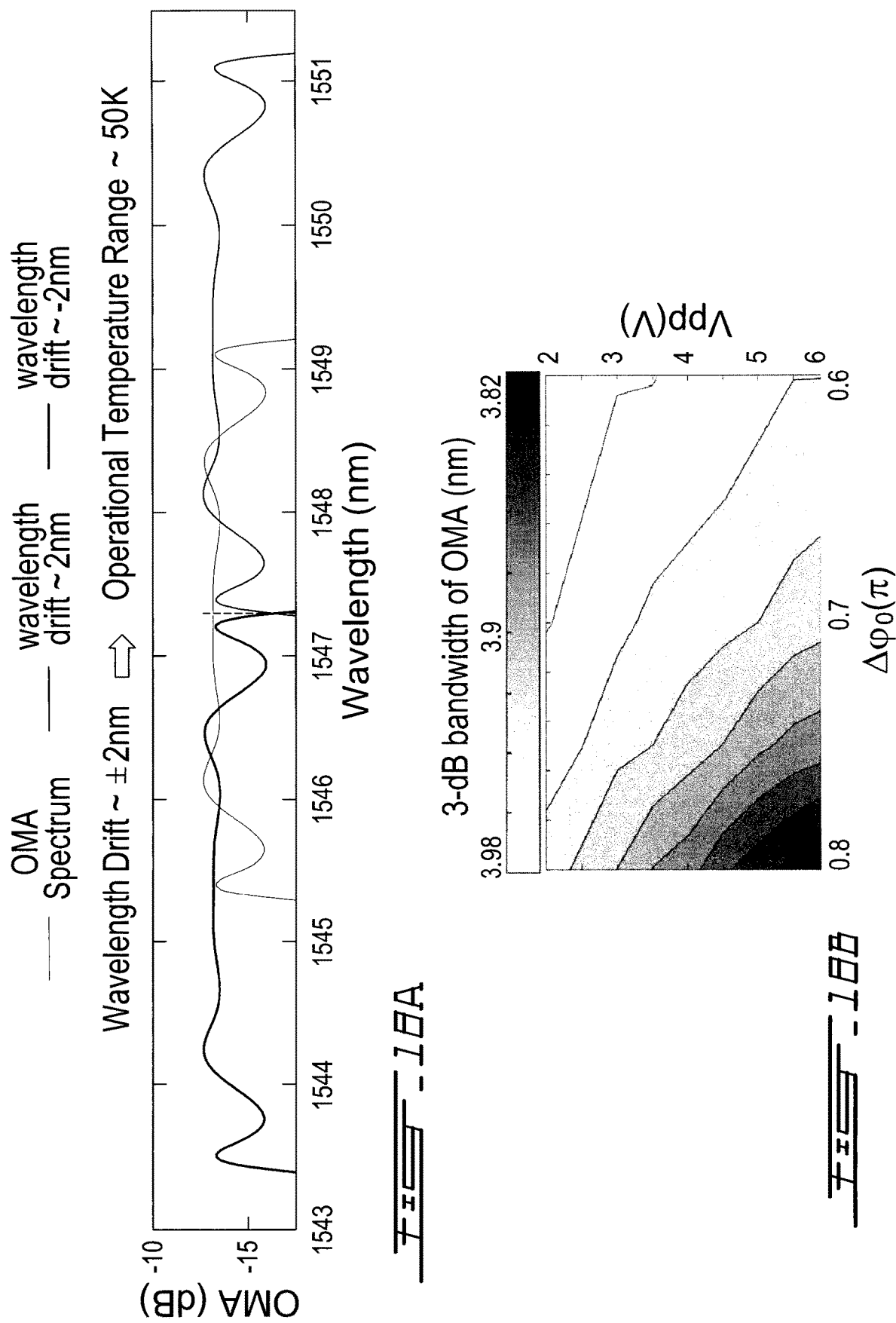
FIG. 18A is a graph showing the optical modulation amplitude with single push-pull driving as function of wavelength for different operating temperatures.
FIG. 18B is a graph showing 3-dB bandwidth of the optical modulation amplitude as function of peak-to-peak bias voltage and initial phase different between the two arm portions of the optical modulator of FIG. 10A.

FIG. 18A indicates OMA spectrum, showing that its 3-dB bandwidth is 3.9 nm. 3-dB bandwidth of OMA as function of $V_{pp}$ and $\Delta\varphi_0$ is shown in FIG. 18B. It is understood that the bandwidth is not overly sensitive to electrical biases. The $\Delta\lambda$ has been measured to be about ±80 Pm resonance shift if operating temperature varies by $\Delta T=\pm1$ K. Thereupon, the optical modulator described herein based on simulation results can tolerate the changing temperature by ~±25 K, corresponding to operating temperature range of ~50 K. As a comparison, MRM has a poor performance with having just a few kelvins thermal range. Modulation efficiency which is the other side of the trade-off is calculated $V_\pi \times L=0.28$ Vcm at $\lambda_0$, confirming that the optical modulator described herein provides significantly more efficient modulation compared to conventional MZM.

The coupled mode theory is used to achieve a dynamic model for the proposed modulator. In this example, IBG starts from z=0 to z=L and phase-shifts are placed at z=L/12, 3L/12, 5L/12, 7L/12, 9L/12, 11L/12. Also, it is supposed that there is a continuous wave (CW) beam at input of BGR-MZM as Ecw=f0 exp(i($\beta z-\omega t$)) when the operational wavelength is $\lambda_0=1547.3$ nm. Envelope of the forward and backward propagating mode fields (F and B, respectively) vary in Bragg grating sections (BGSs) and phase-shift sections (PSSs) as follows:

$$BGS\begin{cases} \frac{\partial F}{\partial z} + \frac{n_{eff}(t)}{c}\frac{\partial F}{\partial t} = ikB\exp(-i2\Delta\beta z) \\ \frac{\partial B}{\partial z} - \frac{n_{eff}(t)}{c}\frac{\partial B}{\partial t} = -ikF\exp(i2\Delta\beta z) \end{cases} \quad (5\text{-}1)$$

$$PSS\begin{cases} \frac{\partial F}{\partial z} + \frac{n_{eff}(t)}{c}\frac{\partial F}{\partial t} = 0 \\ \frac{\partial B}{\partial z} - \frac{n_{eff}(t)}{c}\frac{\partial B}{\partial t} = 0 \end{cases} \quad (5\text{-}2)$$

where c is light speed in vacuum. Also, $n_{eff}(t)$ is effective index of the series of phase shift units that is described as $n_{eff}(t) = n_{eff} - \Delta n_{eff}(t)$, where $n_{eff}$ is effective index of unperturbed waveguide and $\Delta n_{eff}(t)$ is variation of waveguide index because of perturbing. $\Delta n_{eff}$ and $V_{pp}$ on both arms have been illustrated in FIG. 14.

Eq. 10 can be rewritten using normalized parameters:

$$BGS\begin{cases} \frac{\partial F}{\partial T} = -\frac{1}{\eta(T)}\left[\frac{\partial F}{\partial Z} - ikLB\exp(-i2\Delta\beta(T)LZ)\right] \\ \frac{\partial B}{\partial T} = \frac{1}{\eta(T)}\left[\frac{\partial B}{\partial Z} + ikLF\exp(i2\Delta\beta(T)LZ)\right] \end{cases} \quad (6\text{-}1)$$

$$BGS\begin{cases} \frac{\partial F}{\partial T} = -\frac{1}{\eta(T)}\frac{\partial F}{\partial Z} \\ \frac{\partial B}{\partial T} = \frac{1}{\eta(T)}\frac{\partial B}{\partial Z} \end{cases} \quad (6\text{-}2)$$

where:

$$Z = \frac{1}{L}z \quad (7)$$

$$T = \frac{c}{Ln_{eff}}t \quad (8)$$

$$\eta(T) = \frac{n_{eff} - \Delta n_{eff}(t)}{n_{eff}} \quad (9)$$

$$\Delta\beta(T) = \frac{2\pi}{\lambda}(n_{eff} - \Delta n_{eff}(t)) - \frac{\pi}{\Lambda} \quad (10)$$

Figure 19A:
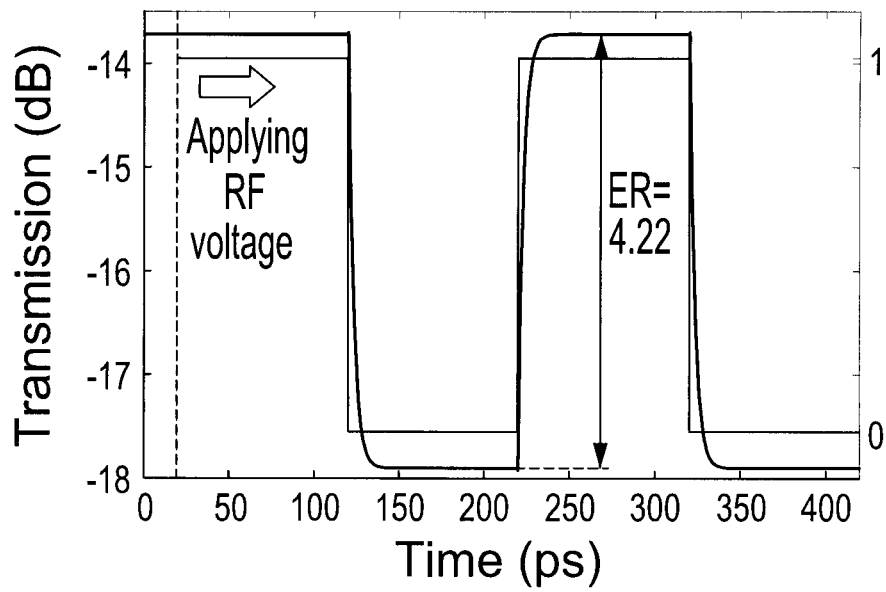
FIG. 19A includes a graph showing transmission as function of time when operating the optical modulator of FIG. 10A at 10 Gb/s.
Figure 19B:
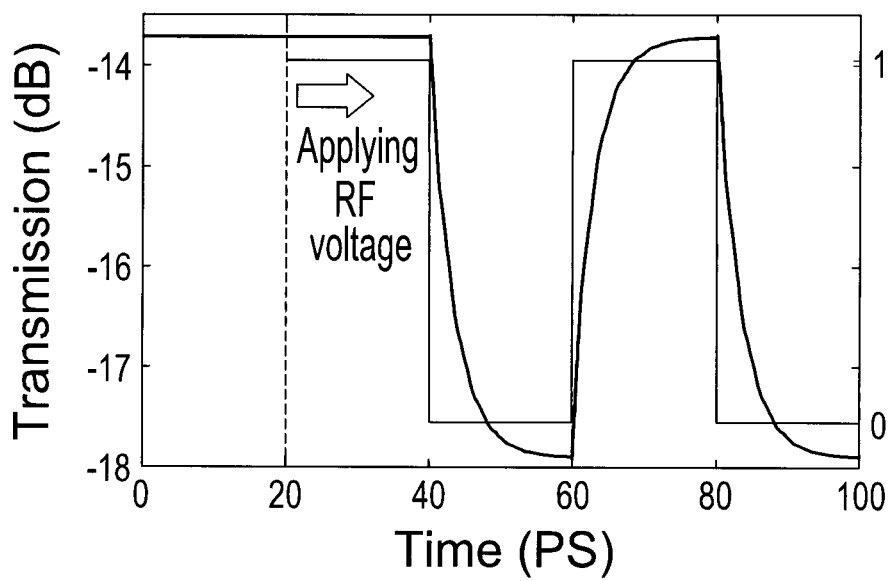
FIG. 19B includes a graph showing transmission as function of time when operating the optical modulator of FIG. 10A at 50 Gb/s.

We use FDTD method to solve above equations. A binary bit sequence is used at different bitrate to evaluate performance of modulator in time domain. FIGS. 19A and 19B show time response of modulator at bitrates of 10 Gb/s and 50 Gb/s.

Figure 20:
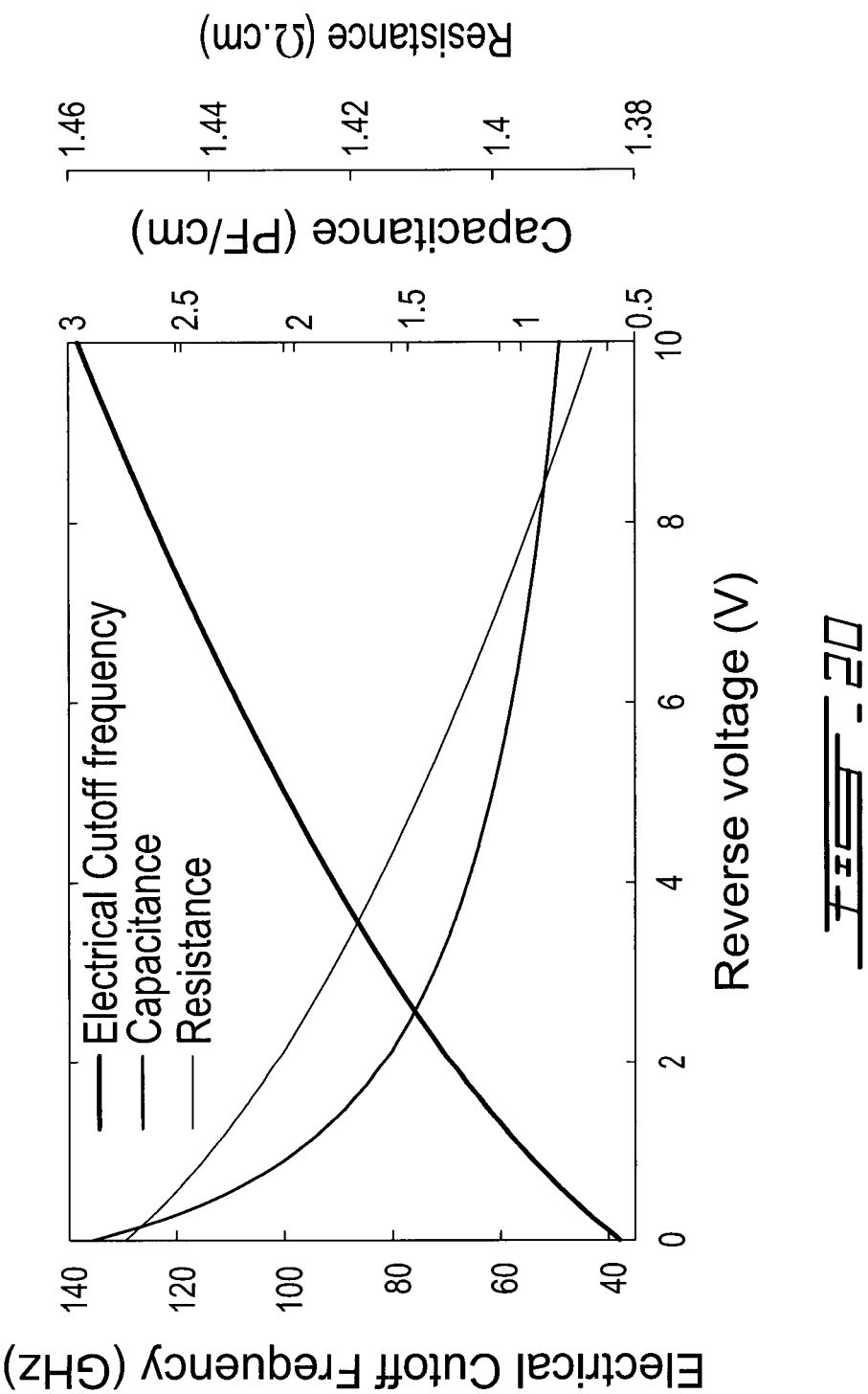
FIG. 20 is a graph showing electrical cut-off frequency, capacitance and resistance as function of the reverse bias voltage for the PN junction of the optical modulator of FIG. 10A.
Figure 21:
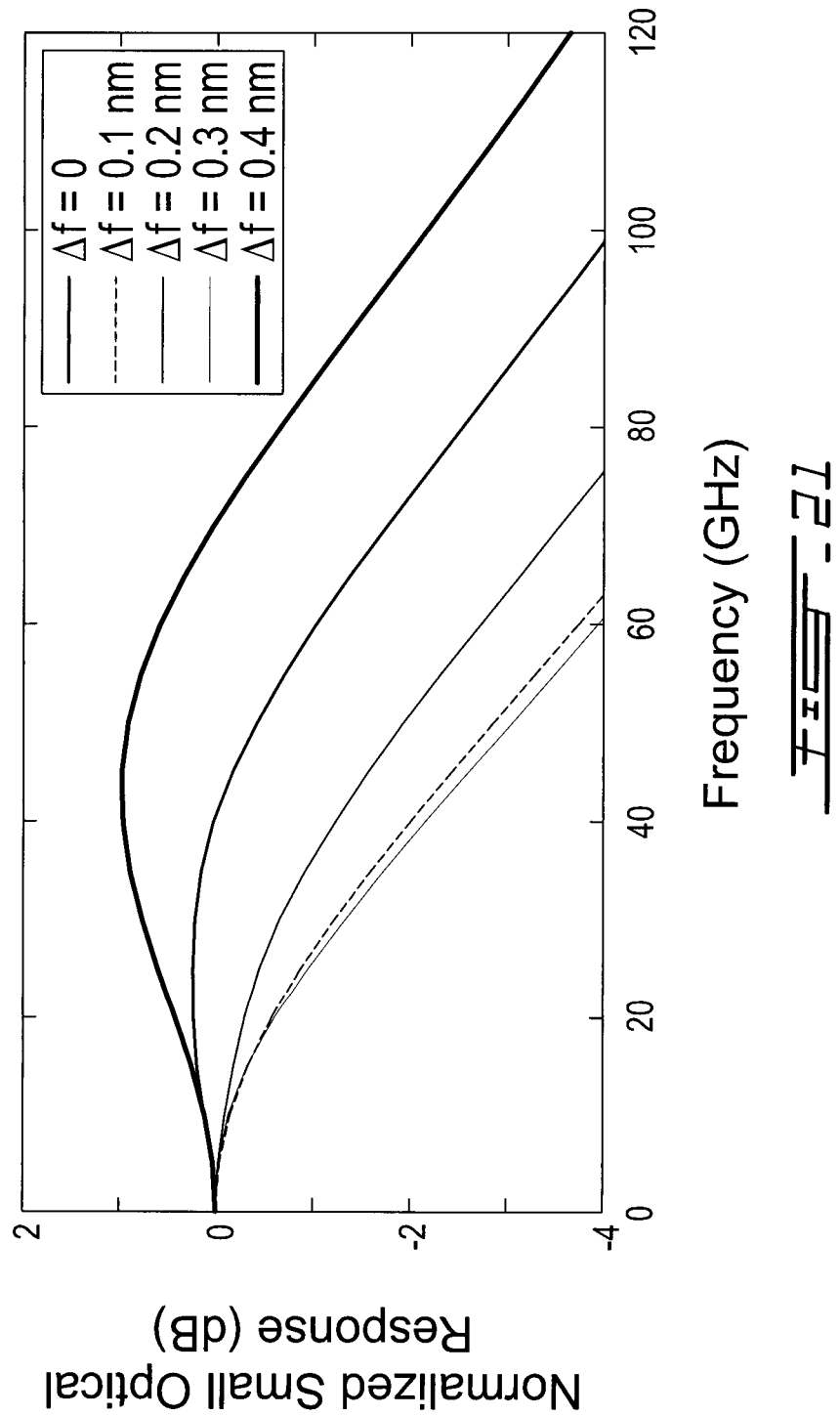
FIG. 21 is a graph showing normalized small signal-optical response as function of frequency for the optical modulator of FIG. 10A, with different frequency detuning values.

The EO bandwidth is limited by electrical and optical terms: RC constant and the total quality factor of the cavities (or the photon life time, $\tau$).

$$\frac{1}{f_c} = \frac{1}{f_{RC}} + \frac{1}{f_\tau} \quad (11)$$

where fc is EO 3-dB cut-off frequency of small signal response of BGR-MZM, fRC presents cut-off frequency of the RC constant of p-n diode at reverse bias, and fr is optical cut-off frequency, given by fr=1/($2\pi\tau$). The resistance and capacitance of the p-n junction are modeled such as shown as function of DC reverse bias in FIG. 20. As can be seen, capacitance of 1.239 PF/cm and resistance of 1.417 $\Omega\cdot$cm are calculated in VDC=−4 V, corresponding to fRC=90.69 GHz. The optical cut-off frequency is provided by applying an impulse to the dynamic model discussed herein and taking Fourier transform. FIG. 21 shows optical small signal response of the modulator described herein for various optical detuning, showing that fr=49.22 GHz for $\Delta f=0$, corresponding to $\tau$ of 3.23 Ps. It is also understood that optical cut-off frequency is increased if operational wavelength is tuned far from resonant wavelength, however at the expense of both reduced operating temperature range and ER. Therefore, operational wavelength is chosen same as resonant wavelength. It is expected that the modulator can introduce EO bandwidth of fc=31.9 GHz.

Figure 22:
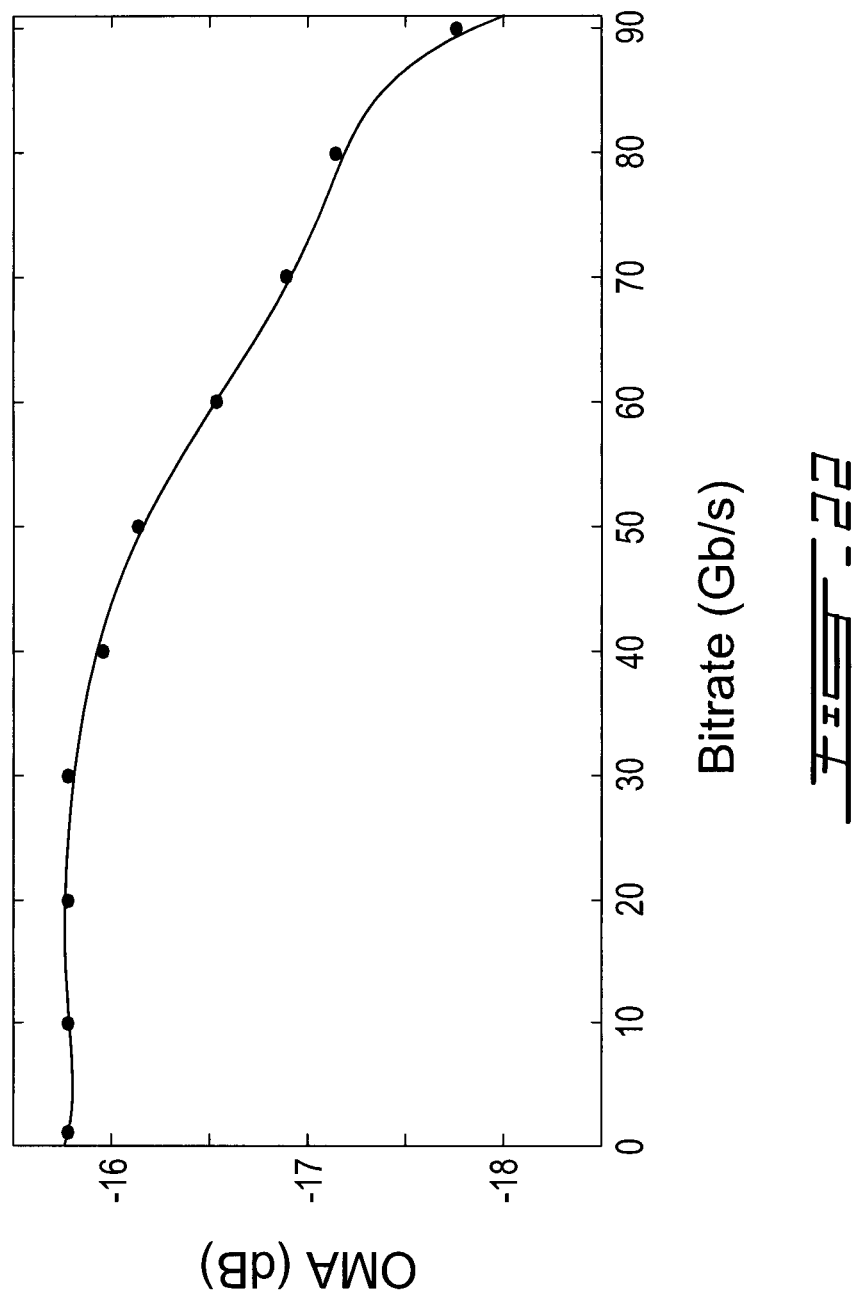
FIG. 22 is a graph showing optical modulation amplitude as function of bitrate for the optical modulator of FIG. 10A.

FIG. 22 shows OMA as a function of bitrate, confirming that OMA is almost constant by 50 Gbps, thereafter it decreases, corresponding to lower ER or closer eye-opening diagram.

Accordingly, in this example, there is described a new design of SiP modulator whose properties are between conventional MZM and MRM. In this design, the modulation efficiency and the operating temperature range are simultaneously ameliorate using slow light. The key idea behind the design of the optical modulator described herein was that taking advantage of resonance enhancement by combining phase-shifted Bragg gratings in order to improve efficiency ($V_\pi \times L = 0.28$ Vcm) in comparison to conventional MZM. Also, the cavities are designed with low quality factor (Q=332), confirming that optical bandwidth remains wide, resulting in extending the carrier wavelength offset to ~±2 nm, corresponding to 50 K thermal tolerance range. Despite cascading resonators, the modulator size is remarkably compact so that length of each arm is just 56.7 μm because of using Bragg grating with high photonic band gap. By solving the standard coupled mode theory with FDTD, a dynamic model of this design is presented, showing that E/O 3-dB cut-off frequency of small signal response of BGR-MZM is 31.9 GHz.

Example 2—Mach-Zehnder Silicon Photonic Modulator Assisted by Phase-Shifted Bragg Gratings In this example, a novel design of optical modulators is demonstrated, which is compatible with complementary metal oxide semiconductor (CMOS) technology: a Mach-Zehnder modulator (MZM) assisted by phase-shifted Bragg grating (PSBG-MZM). The resonant phenomenon is exploited such that the modulator can provide a high modulation efficiency while the optical bandwidth remains wide. It results in a resonant-based silicon photonic (SiP) modulator with a high modulation efficiency ($V_\pi \times L = 0.25$ V·cm), a compact footprint (L=130 μm), and a low-power-consumption operation (80 fJ/bit). Also, unlike other resonance-based modulators (RBMs), the above properties come with other good features such as an operating temperature range of ΔT=20° C., an operational-wavelength window of $\Delta\lambda_0$=1.4 nm, and an EO bandwidth of $f_0$=32 GHz.

Optical interconnect has proved that it is a promising solution to meet the growing performance requirements such as high bandwidth, low required energy per bit, and low latency [1]. Optical modulators are of fundamental components in on-chip and chip-chip optical interconnects. Among them, SiP modulators are currently considered as a preferred candidate to be employed in photonic integrated circuits (PICs) because of being compatible with CMOS manufacturing process. SiP modulators are generally divided into two broad classes: MZM and RBM.

MZMs provide a high-speed modulation and offer a wide optical bandwidth, resulting in a temperature insensitive operation [2]. In addition, MZMs are able to generate chirp-free pulses if operated in push-pull configuration. Despite these advantages, MZMs need long phase shifters in range of several millimeters to obtain the required phase modulation [2]. As a result, MZMs suffer from a large footprint and a high energy consumption per bit; and also a travelling wave electrode should be designed that it in turn introduces some other challenges like RF loss and group velocity mismatch which limits EO bandwidth of MZM [2].

Resonantly enhanced modulation has an enormous potential to address the above issues and allows a drastic reduction of phase shifter's length. Micro-ring modulators (MRMs), for example, have a highly compact footprint and require a low RF driving voltage [3]. However, these benefits come with several challenges. First, the operational-wavelength window is quite narrow such that a small change in environment (for example a thermal variation) makes a huge distortion in the performance. Second, MRMs generate a chirpy pulse. Third, MRMs need a resonator with high quality factor, resulting in limiting the EO bandwidth because of a high photon lifetime.

Combining MZM and other structures that can offer resonant properties is another promising candidate to overcome low modulation efficiency of conventional MZM. MZM loaded with photonic crystal waveguide (PCW) were proposed by [4] that achieves a high modulation efficiency. However, it is well-known that PCW-based designs are very challenging from standard manufacturing processes point of view and a small fabrication error makes a big distortion in the performance of the modulator. In [5], MZMs assisted by micro-ring resonators were proposed to reach modulation enhancement. But, this benefit is provided at the price of increased temperature sensitivity similar to MRMs. To enlarge the operating temperature range, a group of cascaded rings that are introduced into each arm of a Mach-Zehnder interference (MZI) was proposed by [6]. However, FSR limitation is the main hurdle of this design to be developed for WDM applications.

In this example, the optical modulator 758 can allow for achieving a compromise between the performance of the conventional MZMs and the performance of RBMs. The optical modulator 758 is experimentally characterized by a modulation efficiency of $V_\pi \times L = 0.25$ V·cm, a consumed power per bit of 80 fJ/bit, an operational-wavelength window of 1.4 nm, an operating temperature range of 20° C., and a EO bandwidth of 32 GHz. Furthermore, since the optical modulator 758 is operated in the single-push-pull configuration, a chirp-free operation can also be obtained.

Optical modulators operated in the slow-light regime have a promising potential to address current issues facing the conventional MZM. That is because slow-light regime offers a large group index (or high optical delay), enhancing modulation efficiency. However, this regime can also introduce a quit narrow bandwidth. Therefore, a trade-off between efficiency and bandwidth should be considered when exploiting slow-light regime. FIG. 23A shows the schematic of another example of an optical modulator 758 in which each arm portion contains a series of phase shift units such as the one described above, hereinafter referred to as an integrated Bragg grating resonator (IBGR), to make light slow. In references [7], [8], how to engineer the slow-light effect using phase-shifted Bragg grating is discussed in detail. The key idea behind the design of the optical modulator 758 is that the optical bandwidth should remain wide when the modulation efficiency is resonantly increased. The wide optical bandwidth is obtained by employing cavities with low quality factor. Thereafter, cascading these resonators not only obtains the required phase modulation but also keeps optical bandwidth large. Consequently, the optical modulator 758 enables to offer a compact footprint and low power consumption (similar to MRM), and also present a stable operation and a high EO bandwidth (similar to conventional MZM).

To introduce slow light in the optical modulator 758, sidewall corrugations 742 are preferred rather than periodic holes as commonly used in photonic crystal. The advantage of the sidewall corrugations 742 lies in the perspective of practical implementation, however at the cost of reducing optimal figure of merit of slow-light waveguides. As depicted, in this embodiment the specifications of the optical modulator 758 are as follows: L of about 130 mm, $W_{max}$ of about 600 nm, $W_{min}$ of about 400 nm, pitch Λ of about 310 nm, NOP of about 45, NOR of about 6, $H_{rib}$ of about 130 nm, $H_{slab}$ of about 90 nm, X1 of about 390 nm, X2 of about 810 nm, X3 of about 5.2 μm, Y1 of about 370 nm, Y2 of about 830 nm, and Y3 of about 10.4 μm.

As shown in FIG. 23A, the IBGR having a uniform period of Λ=310 nm is placed in each arm of MZM. Each resonator consists of a phase shifted section with a small number of periods (NOP=30) on each side. To achieve the required phase modulation, seven cascaded-coupled resonators are placed in each arm. The Bragg gratings are designed using sidewall corrugations with a duty cycle of 50% in a ridge waveguide having an average width of 500 nm, a 220 nm ridge height and a 90 nm slab height. The maximum waveguide width is 600 nm and the minimum 400 nm. FIG. 23B shows the lateral PN junctions defined in the three doping levels with specific positions in order to minimize optical loss and keep the resistance low. The PN junctions are symmetric.

Figure 23D:
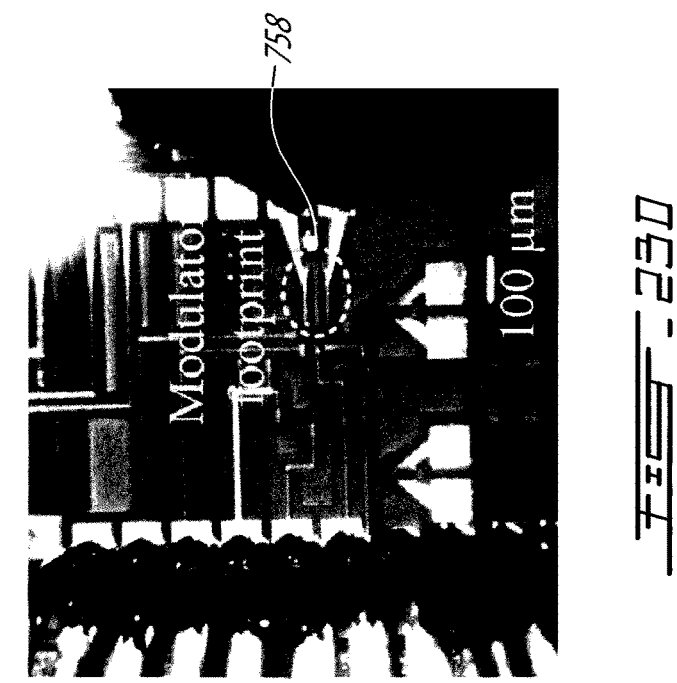
FIG. 23D is schematic view of an example of an optical device incorporating the optical modulator of FIG. 23A.
Figure 23C:
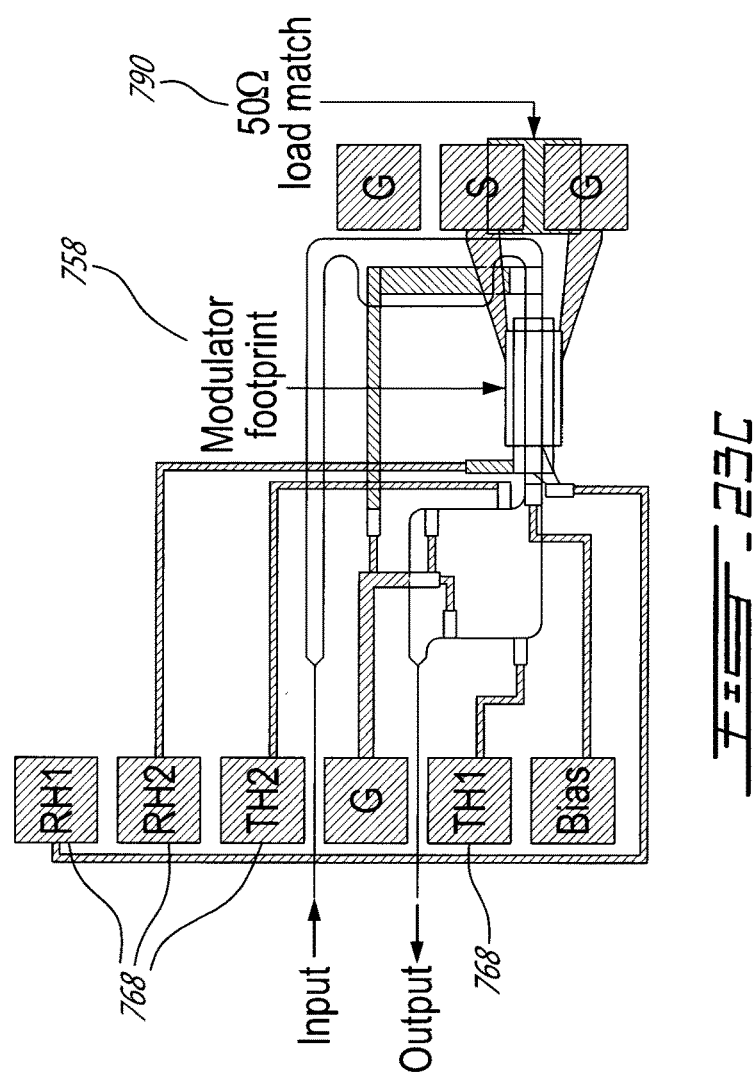
FIG. 23C is a schematic view of an example of a mask layout of the optical modulator of FIG. 23A.

FIG. 23C shows the mask layout of the optical modulator 758. To control the optical modulator 758, four temperature controllers 768 were used in this example. Because of fabrication imperfections, the stopbands of IBGRs in the first and second arm portions 762 and 764 are not typically matched. Therefore, to compensate this issue, two thermal elements RH1 and RH2 were placed on top of the IBGRs. The two other thermal elements TH1 and TH2 were also exploited to bias the operating point at the quadrature point. A 50Ω load 790 is placed between RF pads to obtain RF impedance match. The optical modulator 758 was fabricated in a multi-project wafer run using a standard-193-nm-lithography process at the IME A*STAR with the thickness of silicon layer of 220 nm and the thickness of buried oxide of 2 μm. FIG. 23D shows the fabricated chip. All dimensions are in micrometer scale in this figure, with RH denoting resonant heaters and TH denoting thermal heaters.

Figure 24:
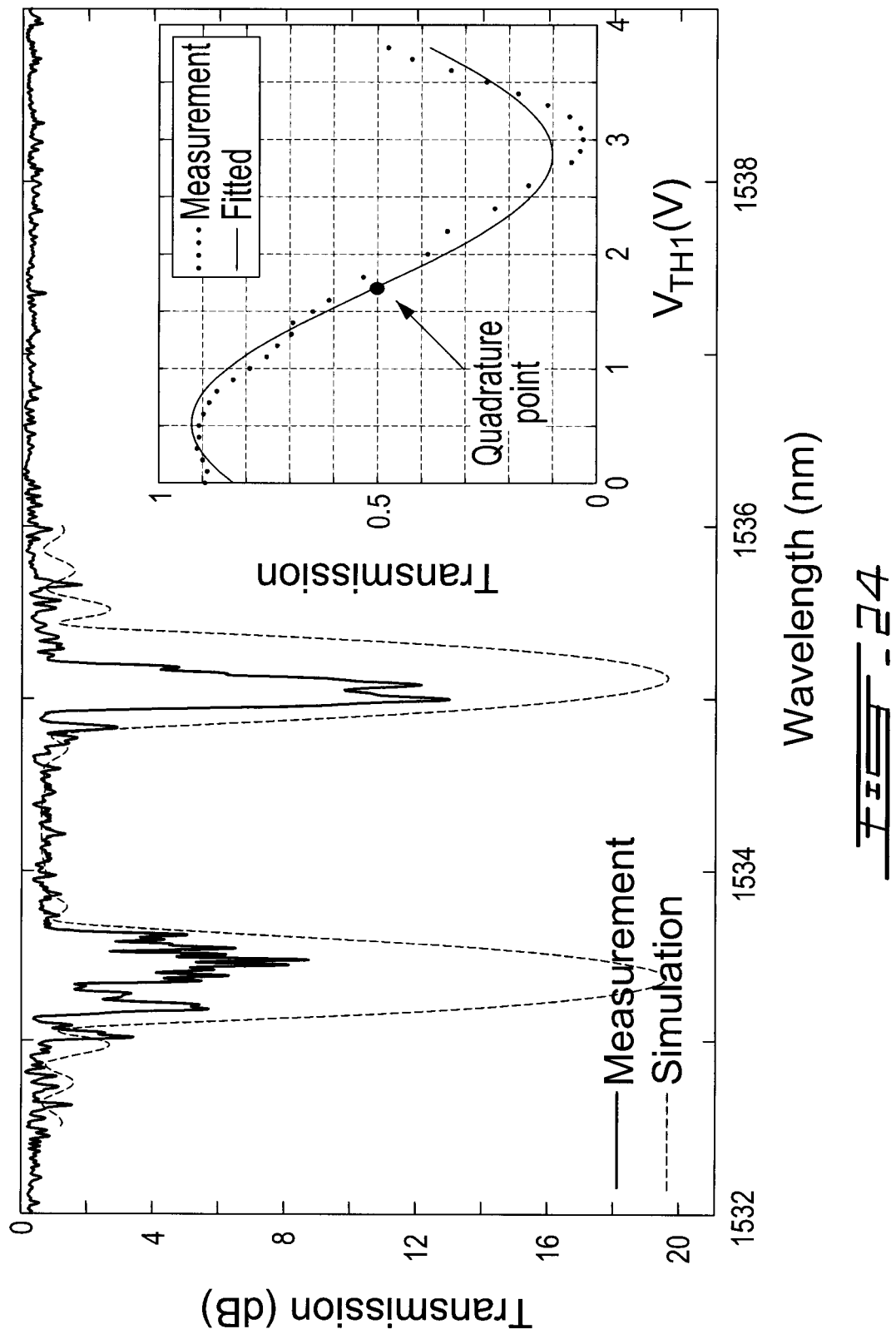
FIG. 24 is a graph showing an example of transmission as function of wavelength for the optical modulator of FIG. 23A, with an inset showing transmission as function of applied voltage of thermal heater at one of the arms.

FIG. 24 shows the optical spectrum of the optical modulator 758. By applying $V_{RH1}$ of 0 V and $V_{RH2}$ of 1.5 V, a good match was achieved between the stopbands of IBGRs. However, still the transmission in stopband is not quite flat and there is ~1 dB ripple that comes from the mismatch between the resonators at each IBGR. The wavelength at middle of stopband is chosen as the operational wavelength which is $\lambda_0$=1534.25 nm. The inset of FIG. 24 indicates the MZI response at $\lambda_0$, showing that the quadrature point is obtained by applying $V_{TH1}$ of 1.71 V and $V_{TH2}$ of 0 V. The IBGR is modeled by [8] in detail in which coupling coefficient K of ~1.7×105 m-1 is considered.

Figure 25:
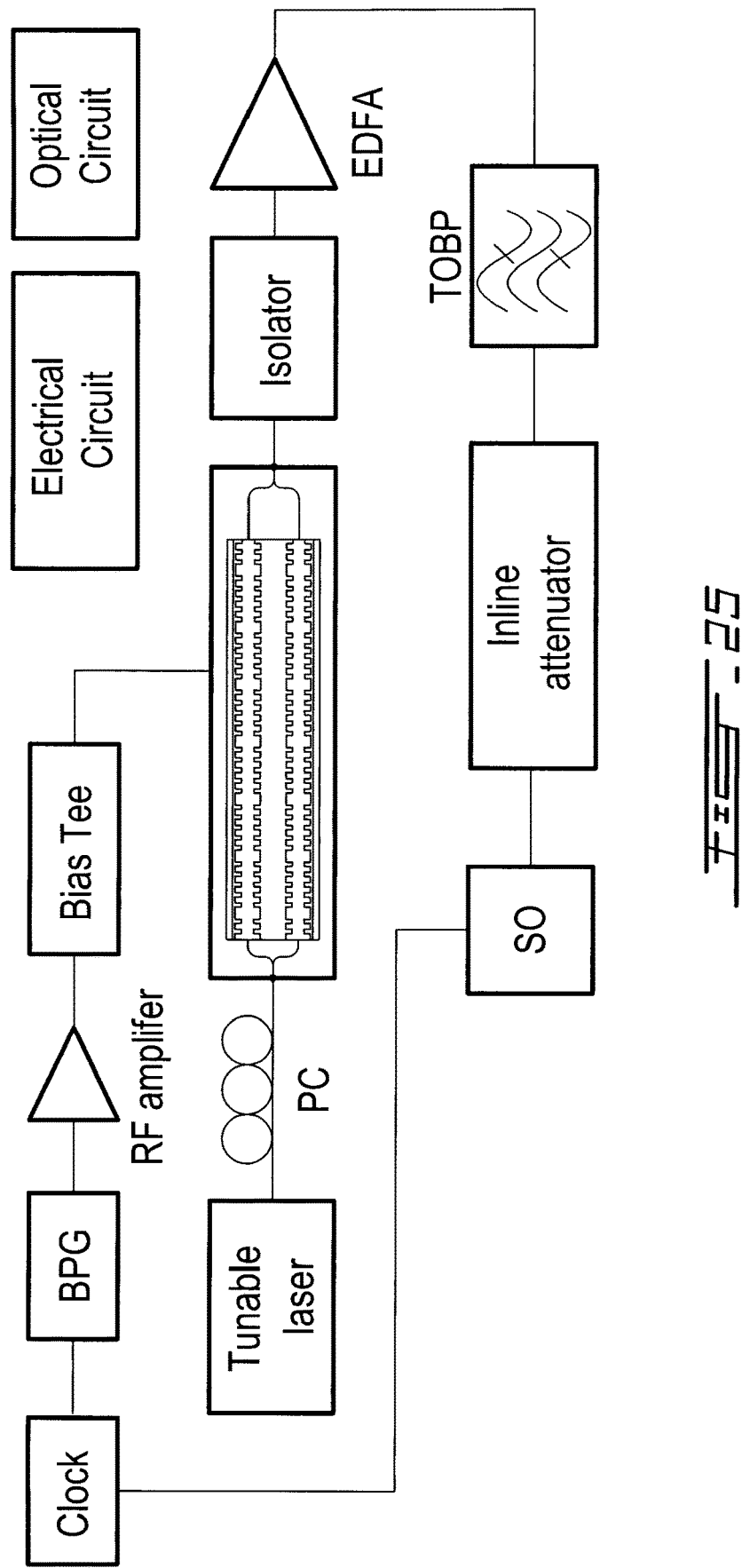
FIG. 25 is a schematic view of an example of an experimental setup used to measure dynamic optical modulation amplitude (OMA), bit error rate (BER), and eye diagram for the optical modulator of FIG. 23A.

The OOK modulation format is used to characterize the modulator performance with experimental setup shown in FIG. 25. A pseudo random bit sequence is first generated, with length of $2^{31}$−1 using bit pattern generator (BPG) (SHF 12124 A). Next, the RF signal is amplified by SHF 807 with 30 GHz bandwidth. During the experiments, the peak-to-peak voltage is 3.5 $V_{pp}$ on each arm of PSBG-MZM. Then, a bias tee is used to combine the DC and RF signals.

The laser power is selected to be 15 dBm. Next, a polarization controller (PC) is exploited to improve fiber-to-chip coupling in the fundamental TE mode. The modulated optical signal after passing from isolator will go inside of an Erbium-doped fiber amplifier (EDFA) to be amplified. Then, a tunable optical bandpass filter (TOBP) with 3-dB bandwidth is set. The TOPB is followed by an inline attenuator to control the received power. To capture the eye-diagrams and measure the BER, an 80 GHz bandwidth sampling oscilloscope (SO) was used. A same clock is employed for BPG and SO to synchronize them. It is important to note that all of the dynamic results are captured without digital signal processing (DSP).

The IBGRs are phase modulators that require to be placed into a MZI to produce an amplitude modulation. Assuming ideal Y-junctions, the output power of MZI is calculated using equations (2) and (3) above, where $P_{in}$ is the input power and a is the propagation loss coefficient. The total phase difference between the two MZI arms is shown by $\Delta\varphi_v$. $\Delta\varphi_0$ represents the initial phase difference between the two arm portions 762 and 764. $\Delta n_{eff}$ is the variation of the waveguide refractive index because of applying voltage. γ is named enhancement factor, representing the modulation enhancement that comes from IBGRs. Finally, k0 is the wavenumber equal to $2\pi/\lambda_0$.

The modulation efficiency can be evaluated by the typical figure of merit ($V_\pi \times L$) and the required energy per bit. The optical modulator 758 records $V_\pi \times L$ of 0.25 V·cm, showing an enhancement factor of γ=9. The p-n junction capacitance at the reverse bias (Vbias) of 1 V is 2 pF/cm. Considering a 130 μm phase shifter length, the total capacitance is 26.1 fF. As a result, the energy consumption per bit of the optical modulator 758 ($E_b = \frac{1}{4} CV_{pp}^2$) is 80 fJ/bit. These results prove that the optical modulator 758 can achieve a drastic improvement in term of modulation efficiency compared to the conventional MZMs that usually present $V_\pi \times L$ of ~2.8 V·cm and $E_b$ of ~8.2 pJ/bit [2].

The total on-chip loss is 18 dB and is described as follows: 14 dB from the two grating couplers, 1 dB from the two 3-dB adiabatic couplers, typical 2.5 dB propagation loss from 1 cm-long routing waveguide, and around 0.5 dB from the doped IBGRs (as shown in FIG. 24). Therefore, when no bias is applied, the optical modulator 758 itself is characterized by around 39 dB/cm at operational wavelength. Such loss in the slow-light regime comes from two issues. First, the propagation loss of slow light inside of the IBGR with strong corrugations. Second, since there is group index mismatch between the slow light in the IBGRs and the fast light in the ridge waveguide, coupling losses at their interfaces are generated. These losses could be mitigated by using a taper in which the group index is increased (or decreased) gradually [9].

Figure 26:
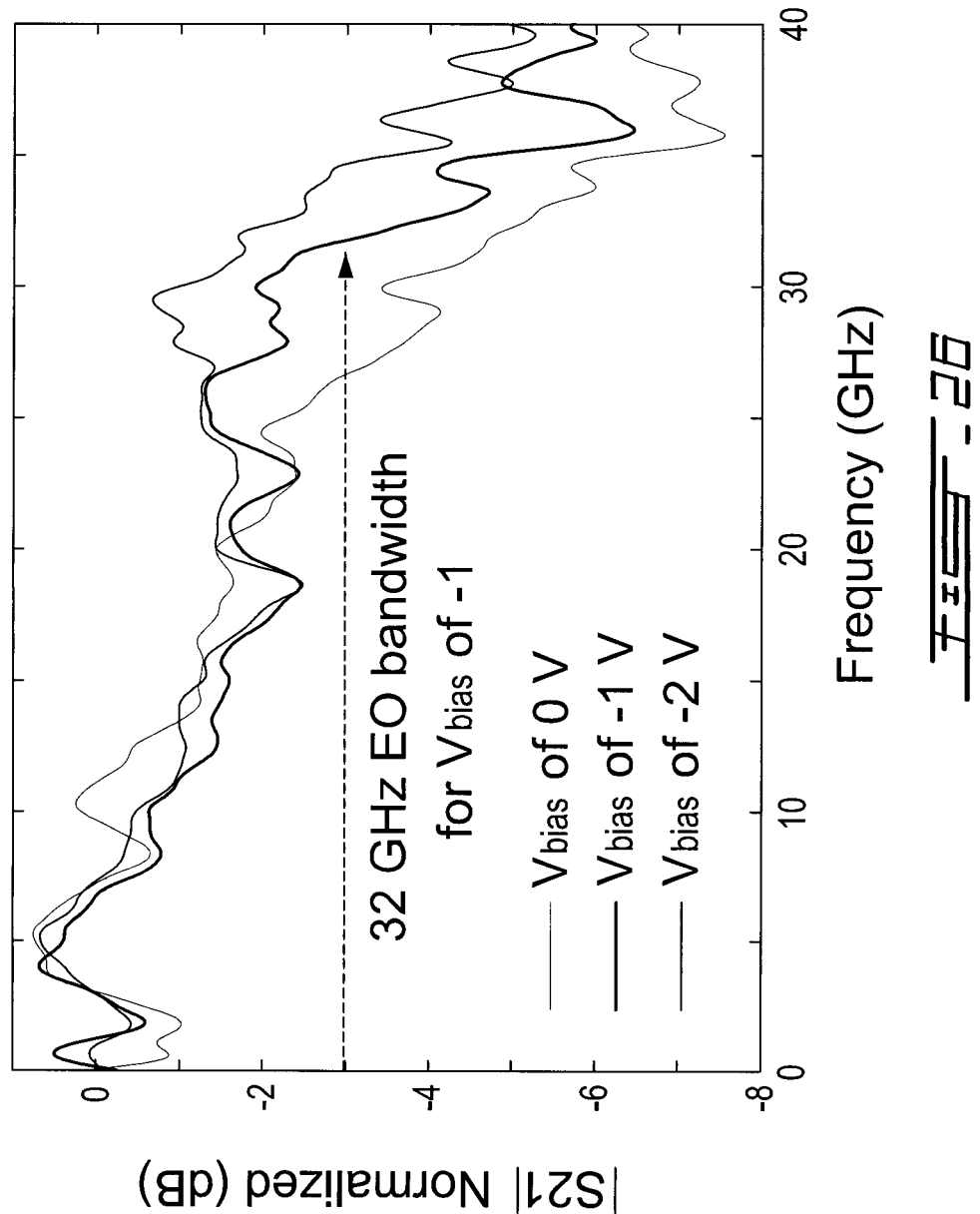
FIG. 26 is a graph showing electro-optic scattering parameter $S_{21}$ as a function of frequency, with $S_{21}$ curves normalized at 100 MHz.

FIG. 26 shows EO scattering parameter $S_{21}$ for different bias points, measured by the PNA Microwave Network Analyzer (Agilent N5227A 10 MHz-67 GHz). It is seen that EO bandwidth is increased by applying a larger reverse voltage. In the measurement presented herein, a PN junction was biased at reverse voltage of 1 V whose EO bandwidth is 32 GHz. An estimation of the EO bandwidth can be explained considering two limiting parameters: photon lifetime of IBGR and RC time constant; $(1/f_0)^2 = (1/f_{RC})^2 + (1/f_\tau)^2$, where $f_0$ is 3-dB EO bandwidth of the optical modulator 758. $f_\tau$ and $f_{RC}$ represent the bandwidth limited by the cavities and PN junction, respectively. To increase the optical bandwidth, the resonators were exploited with low quality factor that results in a cavity time (τ) of around 4 ps, consequently $f_\tau = 1/(2\pi\tau)$ of ~40 GHz. It is seen that photon lifetime applies a lower limitation on EO bandwidth compared to MRM which has a typical photon lifetime of τ~14.6 ps (corresponding to $f_\tau$ of ~10 GHz) [3]. Furthermore, the RC constant of the optical modulator 758 in $V_{bias}$ of −1 V is counted about 2.8 ps (modeled in [8]), resulting in $f_{RC} = 1/(2\pi RC)$ of ~55 GHz. Considering Eq. 3, the EO bandwidth is ~32 GHz. In comparison to conventional MZM, the optical modulator 758 operates with lumped electrodes, and thus, does not suffer from the problems associated with travelling wave electrodes. As a result, there is no RF loss and the EO velocity mismatch plays almost no role to limit the EO bandwidth.

Figure 27:
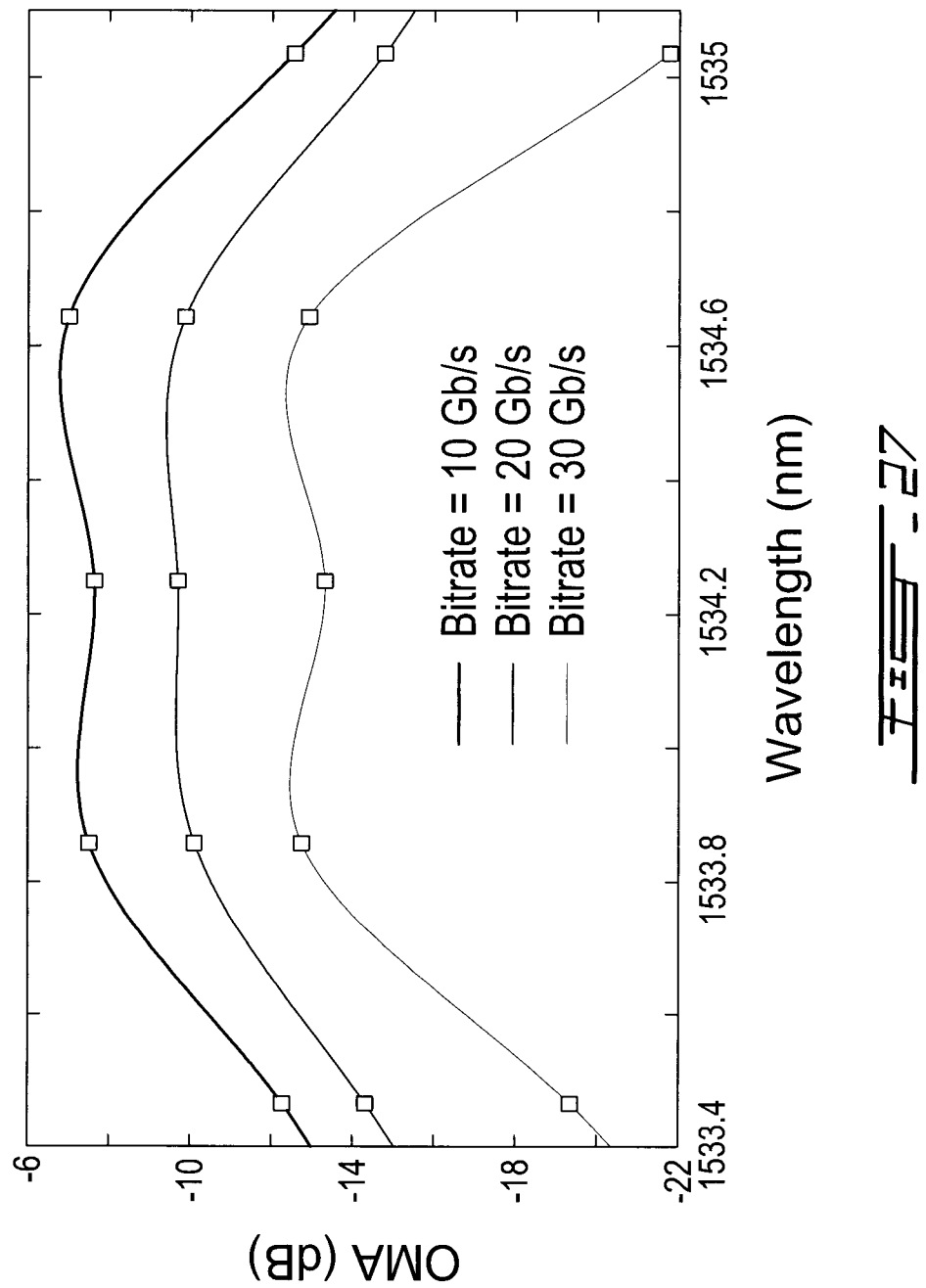
FIG. 27 is a graph showing OMA spectra measured for bitrates of 10 Gb/s, 20 Gb/s, and 30 Gb/s at reverse bias of 1 V using the optical modulator of FIG. 23A.

To evaluate the quality of the modulated signal, the dynamic OMA of PSBG-MZM was measured at the operational wavelength. The OMA is computed using OMA=10 log($P_1/P_{in}$–$P_0/P_{in}$), where $P_1$, $P_0$ and $P_{in}$ are output power corresponding bit "1", output power corresponding bit "0", and the input power, respectively. FIG. 27 zooms on the OMA for different bitrates. As can be seen, the OMA's values is reduced with increasing modulation speed. If a typical resonant shift of 74 μm/° C. created by thermal variation is considered [6], a 3-dB bandwidth of each OMA curve leads to having an operating temperature range of ~20° C. It is important to note that the optical modulator 758 obtains a similar modulation efficiency as a conventional-single-resonator modulator while operating temperature range becomes several times larger. The temperature tolerance might not be sufficient for some applications, where thermal control would be needed. However, compared to, for example, MRM, the requirement on the thermal control is significantly relaxed, leading to reduced cost and control circuit complexity. In fact, wavelength selectivity with a reasonable bandwidth is arguably a desirable feature.

Figure 28A:
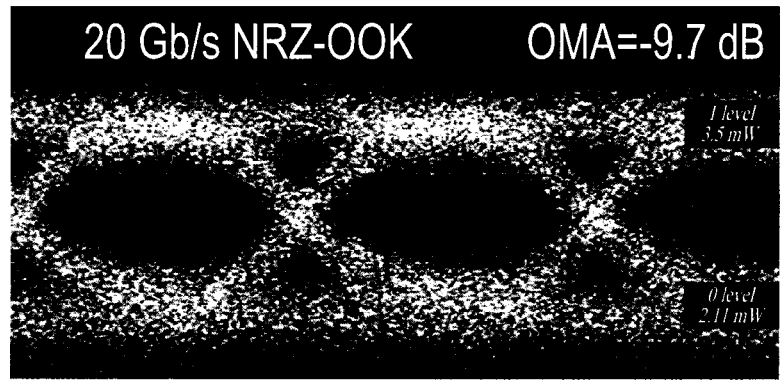
FIG. 28A is an eye diagram for bitrates of 20 Gb/s using the optical modulator of FIG. 23A.
Figure 28B:
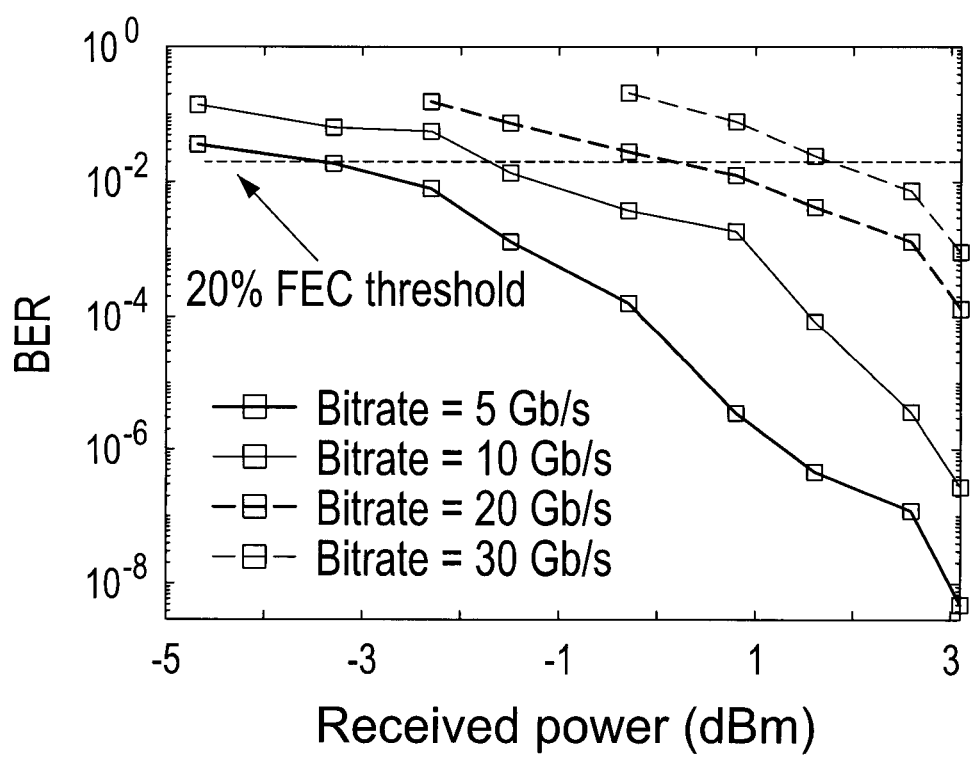
FIG. 28B is a graph showing BER as function of received power for different bitrates using the optical modulator of FIG. 23A, with results being measured at reverse bias of 1 V and at operational wavelength.
Figure 29:
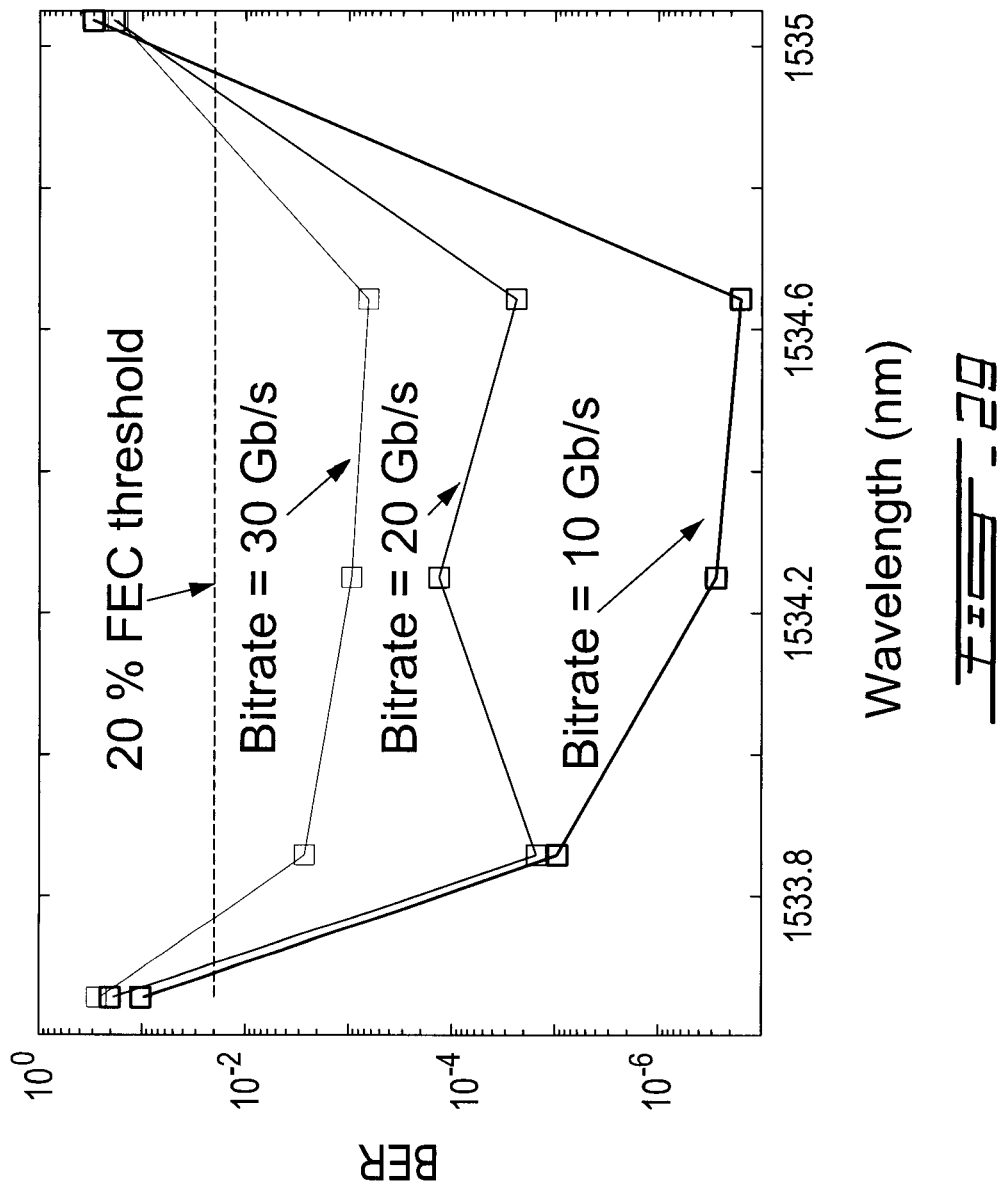
FIG. 29 is a graph showing BER as function of wavelength for different bitrates using the optical modulator of FIG. 23A, measuring at reverse bias of 1 V.

FIG. 28A shows the eye diagram of the modulated signal at 20 Gb/s without DSP. In order to present a quantitative evaluation of the optical modulator 758 performance for different modulation speeds, BER curves were measured as a function of the received power at the operational wavelength and the reverse bias of 1 V indicated in FIG. 28B. Assuming 20% FEC threshold of $2\times10^{-2}$, the optical modulator 758 provides error-free operations for all of the baudrates without applying DSP. FIG. 29 shows the operational-wavelength window in which the optical modulator 758 can provide BER of lower than 20% FEC threshold. The wavelength window is around 1.4 nm, confirming that operational wavelength of the optical modulator 758 is ~20° C.

In this example, a MZM assisted by the coupled resonators that not only makes a significant improvement in the modulation efficiency but also operates in a stable condition was experimentally demonstrated. IBGRs formed by resonators with a low quality factor were used. In comparison to the conventional MZMs, the optical modulator 758 is characterized by a lower power consumption (80 fJ/bit), an improved modulation efficiency ($V_\pi \times L$=0.25 V·cm), and a more compact footprint (L=130 μm). The optical modulator 758 operates with more tolerance against temperature variation (ΔT=20° C.) that results in more stable performance compared to MRM. Furthermore, the EO bandwidth of 32 GHz is obtained because of a low photon lifetime and no EO phase mismatch. Finally, the optical modulator 758 operates in push-pull configuration, thus making a reduction in the chirp of the modulated signal.

In other embodiments, the dimensions can be different. For instance, in another specific embodiment, the specification of another example of such a optical modulator are as follows: $W_{max}$ of about 1100 nm, $W_{min}$ of about 150 nm, pitch A of about 300 nm, NOP of about 45, NOR of about 6, $H_{rib}$ of about 130 nm, $H_{slab}$ of about 90 nm, X1 of about 390 nm, X2 of about 810 nm, X3 of about 5.2 μm, Y1 of about 370 nm, Y2 of about 830 nm, and Y3 of about 10.4 μm.

REFERENCES

[1] M. R. T. Tan et al., "Universal Photonic Interconnect for Data Centers," J. Light. Technol., vol. 36, no. 2, pp. 175-180, 2018.

[2] D. Patel et al., "Design, analysis, and transmission system performance of a 41 GHz silicon photonic modulator," Opt. Express, vol. 23, no. 11, p. 14263, 2015.

[3] R. Dubé-Demers, S. LaRochelle, and W. Shi, "Ultrafast pulse-amplitude modulation with a femtojoule silicon photonic modulator," Optica, vol. 3, no. 6, p. 622, 2016.

[4] T. Tatebe, T. Baba, Y. Hinakura, and Y. Terada, "Si Photonic Crystal Slow-Light Modulators with Periodic p-n Junctions," J. Light. Technol. Vol. 35, Issue 9, pp. 1684-1692, vol. 35, no. 9, pp. 1684-1692, 2017.5]R. Li et al., "An 80 Gb/s Silicon Photonic Modulator Based on the Principle of Overlapped Resonances," IEEE Photonics J., vol. 9, no. 3, pp. 1-11, 2017.

[6] S. Romero-Garcia et al., "High-speed resonantly enhanced silicon photonics modulator with a large operating temperature range," Opt. Lett., vol. 42, no. 1, p. 81, 2017.

[7] O. Jafari, H. Sepehrian, W. Shi, and S. LaRochelle, "Silicon Photonic Modulator based on Coupled Bragg Grating Resonators used as Phase Shifters," in Optical Fiber Communication Conference, 2018, no. c, p. Th2A.20.

[8] O. Jafari, H. Sepehrian, W. Shi, and S. Larochelle, "High-Efficiency Silicon Photonic Modulator Using Coupled Bragg Grating Resonators," JLT, 2019.

[9] Y. Zhao, Y.-N. Zhang, Q. Wang, and H. Hu, "Review on the Optimization Methods of Slow Light in Photonic Crystal Waveguide," IEEE Trans. Nanotechnol., vol. 14, no. 3, pp. 407-426, May 2015.

As can be understood, the examples described above and illustrated are intended to be exemplary only. Each photonic chip can be configured both as a transmitter and as a receiver to allow bi-directional optical communication. For instance, although the examples describe an optical modulator having two or four arm portions connected in parallel with one another, it is noted that other embodiments of the optical modulator can have more than two, or more than four arm portions connected in parallel with one another. The scope is indicated by the appended claims.

What is claimed is:

1. An optical phase modulator comprising:
   a substrate;
   a waveguide mounted to the substrate and extending along a path of the substrate, the waveguide having a first series of phase shift units distributed along the waveguide, each phase shift unit having two Bragg gratings being spaced apart from one another along the path and a cavity between the two spaced-apart Bragg gratings; and
   a modulation circuit configured for driving at least two of the phase shift units of the first series in phase with one another in accordance with a modulation signal thereby modulating a refractive index of the waveguide to induce a phase shift to an optical signal propagating along the waveguide.

2. The optical phase modulator of claim 1 wherein each cavity is a pi-phase shift cavity.

3. The optical phase modulator of claim 1 wherein each cavity has a longitudinally extending rectangular cross-section.

4. The optical phase modulator of claim 1 wherein the phase shift units of the first series are longitudinally adjacent to one another.

5. The optical phase modulator of claim 1 wherein each of the Bragg gratings includes a plurality of longitudinally spaced-apart corrugations each protruding from the waveguide in a manner perpendicular to the path.

6. The optical phase modulator of claim 1 wherein waveguide has a second series of phase shift units being spaced apart from the first series of phase shift units along the path.

7. The optical phase modulator of claim 6 wherein the modulation signal is a first modulation signal, the modulation circuit being configured for driving at least two of the phase shift units of the second series in phase with one another in accordance with a second modulation signal different from the first modulation signal.

8. The optical phase modulator of claim 1 wherein the modulation circuit has anode and cathode terminals each extending along a respective one of two opposite sides of the waveguide, and a voltage source electrically connected to the anode and cathode terminals, said modulating including driving the at least two of the phase shift units of the first series via the voltage source.

9. The optical phase modulator of claim 8 wherein the waveguide has p-doped and n-doped semiconductor regions both extending along the path and defining a junction extending longitudinally along the waveguide, the anode and cathode terminals being electrically connected to the p-doped and n-doped semiconductor regions, said modulating including driving the junction via the voltage source.

10. The optical phase modulator of claim 9 wherein said driving includes reverse biasing the junction.

11. The optical phase modulator of claim 1 wherein the waveguide is a ridge waveguide.

12. The optical phase modulator of claim 1 wherein the substrate is a silicon-on-insulator substrate comprising a silicon base layer, an insulator layer mounted on the silicon base layer, the waveguide being mounted on the insulator layer, and a cladding layer mounted on the insulator layer and on the waveguide, the waveguide being made of silicon.

13. An optical modulator comprising:
a substrate;
a waveguide extending along the substrate, the waveguide having an input portion leading to first and second arm portions connected in parallel to one another and each extending along a respective path, the first and second arm portions combining to one another into at least one output portion, the first arm portion having a first series of phase shift units distributed therealong, each phase shift unit having two Bragg gratings which are spaced apart from one another along the path and a cavity between the two spaced-apart Bragg gratings; and
a modulation circuit configured for driving at least two of the phase shift units of the first series in phase with one another in accordance with a first modulation signal thereby modulating a refractive index of the first arm portion of the waveguide to induce a phase shift to the optical signal propagating therealong.

14. The optical modulator of claim 13 wherein the second arm portion has a second series of phase shift units distributed therealong.

15. The optical modulator of claim 14 wherein the modulation circuit is configured for driving at least two of the phase shift units of the second series in phase with one another in accordance with the first modulation signal.

16. The optical modulator of claim 14 wherein the modulation circuit is configured for driving at least two of the phase shift units of the second series in accordance with a second modulation signal being different from the first modulation signal.

17. The optical modulator of claim 13 wherein the first arm portion of the waveguide has a third series of phase shift units distributed therealong, the first series of phase shift units being longitudinally spaced apart from the third series of phase shift units.

18. The optical modulator of claim 17 wherein the modulation circuit is configured for driving at least two of the phase shift units of the third series in accordance with a third modulation signal being different from the first modulation signal.

19. The optical modulator of claim 17 wherein the second arm portion has a second series of phase shift units distributed therealong and a fourth series of phase shift units longitudinally spaced from the second series of phase shift units.

20. The optical modulator of claim 19 wherein the modulation circuit is configured for driving the first and second series of phase shift units in accordance with the first modulation signal and wherein the modulation circuit is configured for driving the third and fourth series of phase shift units in accordance with a second modulation signal.

* * * * *